US012293098B2

United States Patent
Shim et al.

(10) Patent No.: US 12,293,098 B2
(45) Date of Patent: May 6, 2025

(54) NONVOLATILE MEMORY DEVICE AND OPERATION METHOD THEREOF

(71) Applicant: Samsung Electronics Co., Ltd., Suwon-si (KR)

(72) Inventors: Dongkyo Shim, Seoul (KR); Sang Soo Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 128 days.

(21) Appl. No.: 18/053,919

(22) Filed: Nov. 9, 2022

(65) Prior Publication Data

US 2023/0153001 A1  May 18, 2023

(30) Foreign Application Priority Data

Nov. 16, 2021 (KR) .................. 10-2021-0157943
Apr. 21, 2022 (KR) .................. 10-2022-0049548

(51) Int. Cl.
*G06F 3/00* (2006.01)
*G06F 3/06* (2006.01)

(52) U.S. Cl.
CPC ............ *G06F 3/064* (2013.01); *G06F 3/0619* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,154,782 B2 | 12/2006 | Lakhani et al. | |
| 7,477,545 B2 | 1/2009 | Tu et al. | |
| 8,904,095 B2 | 12/2014 | Kim et al. | |
| 9,766,814 B2 | 9/2017 | Guo et al. | |
| 10,861,580 B2 | 12/2020 | Kanno | |
| 10,866,906 B2 | 12/2020 | Ha et al. | |
| 11,481,123 B1* | 10/2022 | Cariello ............... | G06F 3/0619 |
| 2003/0090938 A1* | 5/2003 | Taura .................... | G11C 16/20 |
| | | | 365/185.09 |
| 2019/0051372 A1 | 2/2019 | Kim | |
| 2019/0188101 A1* | 6/2019 | Kim ................... | G06F 11/2094 |
| 2019/0237153 A1 | 8/2019 | Hong et al. | |
| 2021/0042201 A1* | 2/2021 | Byun ................... | G06F 3/0659 |
| 2022/0391280 A1 | 12/2022 | Liu | |

FOREIGN PATENT DOCUMENTS

CN    113544784 A    10/2021

* cited by examiner

*Primary Examiner* — Midys Rojas
(74) *Attorney, Agent, or Firm* — Harness, Dickey & Pierce, P.L.C.

(57) ABSTRACT

Disclosed is a nonvolatile memory device which includes a first plane that includes a plurality of memory blocks, a second plane that includes a plurality of memory blocks, an address replacing circuit that receives a first input address from an external controller, the first input address corresponding to a first memory block of the plurality of memory blocks of the first plane from an external controller and outputs a replaced address based on the first input address and bad block information, and an address decoder that controls word lines connected with a second memory block based on the replaced address, the word lines corresponding to the replaced address from among the plurality of memory blocks of the second plane. The first memory block of the first plane is a bad block.

20 Claims, 25 Drawing Sheets

FIG. 13

| 1st Plane | | |
|---|---|---|
| BLK No. | Internal ADDR | Physical ADDR |
| BLK10 | ADDR_i10 | ADDR_p10 |
| BLK11 | ADDR_i11 | ADDR_p11 |
| BLK12 | ADDR_i12 | ADDR_p12 |
| BLK13 | ADDR_i13 | ADDR_p13 |
| BLK14 | ADDR_i14 | ADDR_p14 |
| BLK15 | ADDR_i15 | ADDR_p15 |
| BLK16 | ADDR_i16 | ADDR_p16 |
| BLK17 | ADDR_i17 | ADDR_p17 |

| 2nd Plane | | |
|---|---|---|
| BLK No. | Internal ADDR | Physical ADDR |
| BLK20 | ADDR_i20 | ADDR_p20 |
| BLK21 | ADDR_i21 | ADDR_p21 |
| BLK22 | ADDR_i22 | ADDR_p22 |
| BLK23 | ADDR_i23 | ADDR_p23 |
| BLK24 | ADDR_i24 | ADDR_p24 |
| BLK25 | ADDR_i25 | ADDR_p25 |
| BLK26 | ADDR_i26 | ADDR_p26 |
| BLK27 | ADDR_i27 | ADDR_p27 |

FIG. 14A

| 1st Plane | | |
|---|---|---|
| BLK No. | Internal ADDR | Physical ADDR |
| BLK10 | ADDR_i10 | ADDR_p10 |
| BLK11 | ADDR_i11 | ADDR_p11 |
| BLK12 | ADDR_i12 | ADDR_p12 |
| BLK13 | ADDR_i13 | ADDR_p13 |
| BLK14 | ADDR_i14 | ADDR_p14 |
| BLK15 | ADDR_i15 | ADDR_p15 |
| BLK16 | ADDR_i16 | ADDR_p16 |
| BLK17 | ADDR_i17 | ADDR_p17 |

| Free Slot | ADDR_i18 | - |
|---|---|---|

| 2nd Plane | | |
|---|---|---|
| BLK No. | Internal ADDR | Physical ADDR |
| BLK20 | ADDR_i20 | ADDR_p20 |
| BLK21 | ADDR_i21 | ADDR_p21 |
| BLK22 | ADDR_i22 | ADDR_p22 |
| BLK23 | ADDR_i23 | ADDR_p23 |
| BLK24 | ADDR_i24 | ADDR_p24 |
| BLK25 | ADDR_i25 | ADDR_p25 |
| BLK26 | ADDR_i26 | ADDR_p26 |
| BLK27 | ADDR_i27 | ADDR_p27 |

| Free Slot | ADDR_i28 | - |
|---|---|---|

FIG. 14B

| 1st Plane | | |
|---|---|---|
| BLK No. | Internal ADDR | Physical ADDR |
| BLK10(BB) | ADDR_i10 | ADDR_p10 |
| BLK11 | ADDR_i11 | ADDR_p11 |
| BLK12 | ADDR_i12 | ADDR_p12 |
| BLK13 | ADDR_i13 | ADDR_p13 |
| BLK14 | ADDR_i14 | ADDR_p14 |
| BLK15 | ADDR_i15 | ADDR_p15 |
| BLK16 | ADDR_i16 | ADDR_p16 |
| BLK17 | ADDR_i17 | ADDR_p17 |

| Free Slot | ADDR_i18 | ADDR_p27 |
|---|---|---|

| 2nd Plane | | |
|---|---|---|
| BLK No. | Internal ADDR | Physical ADDR |
| BLK20 | ADDR_i20 | ADDR_p20 |
| BLK21 | ADDR_i21 | ADDR_p21 |
| BLK22 | ADDR_i22 | ADDR_p22 |
| BLK23 | ADDR_i23 | ADDR_p23 |
| BLK24 | ADDR_i24 | ADDR_p24 |
| BLK25 | ADDR_i25 | ADDR_p25 |
| BLK26 | ADDR_i26 | ADDR_p26 |
| BLK27 | ADDR_i27 | Invalid |

| Free Slot | ADDR_i28 | - |
|---|---|---|

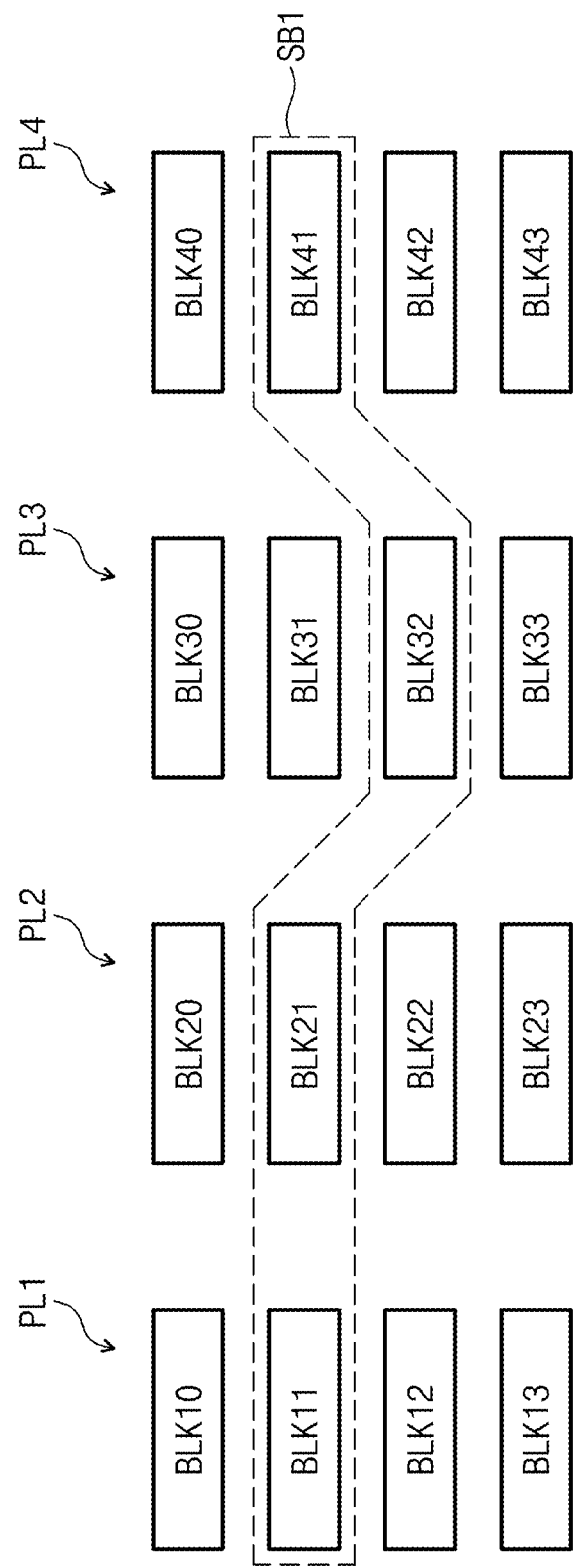

NONVOLATILE MEMORY DEVICE AND OPERATION METHOD THEREOF

CROSS-REFERENCE TO RELATED APPLICATIONS

This application claims priority under 35 U.S.C. § 119 to Korean Patent Application No. 10-2021-0157943 filed on Nov. 16, 2021 in the Korean Intellectual Property Office, and Korean Patent Application No. 10-2022-0049548 filed on Apr. 21, 2022 in the Korean Intellectual Property Office, the disclosures of which are incorporated by reference herein in their entireties.

BACKGROUND

Example embodiments of the present disclosure described herein relate to a semiconductor memory, and more particularly, relate to a nonvolatile memory device and an operation method thereof.

A semiconductor memory device may be classified as a volatile memory device, in which stored data disappear when a power supply is turned off. Examples of volatile memories include a static random access memory (SRAM) or a dynamic random access memory (DRAM). A semiconductor memory device may be classified as a nonvolatile memory device, in which stored data are retained even when a power supply is turned off. Examples of non-volatile memories include a flash memory device, a phase-change RAM (PRAM), a magnetic RAM (MRAM), a resistive RAM (RRAM), or a ferroelectric RAM (FRAM).

Flash memory is being widely used as a high-capacity storage medium. A defective or bad block may occur due to various factors in the process of manufacturing the flash memory or while driving the flash memory. Because the bad block may be incapable of storing data normally, various operations for processing the bad block or replacing the bad block with any other memory block are desirable for a normal operation of the flash memory.

SUMMARY

Example embodiments of the present disclosure provide a nonvolatile memory device with improved performance and an improved available capacity and an operation method of the nonvolatile memory device.

According to an example embodiment, a nonvolatile memory device includes a first plane that includes a plurality of memory blocks, a second plane that includes a plurality of memory blocks, an address replacing circuit that receives a first input address from an external controller, the first input address corresponding to a first memory block of the plurality of memory blocks of the first plane and outputs a replaced address based on the first input address and bad block information, and an address decoder that controls word lines connected with a second memory block based on the replaced address, the word lines corresponding to the replaced address from among the plurality of memory blocks of the second plane, and the first memory block of the first plane is a bad block.

According to an example embodiment, an operation method of a nonvolatile memory device that includes a first plane and a second plane includes receiving a first input address from an external controller, the first input address corresponding to a first memory block being a bad block from among a plurality of memory blocks of the first plane, and performing an operation on a second memory block of a plurality of memory blocks of the second plane.

According to an example embodiment, a nonvolatile memory device includes a first plane that includes a plurality of first memory blocks, the plurality of first memory blocks connected through a plurality of first bit lines, a second plane that includes a plurality of second memory blocks, the plurality of second memory blocks connected through a plurality of second bit lines, and a control logic circuit. A first dedicated main block that stores first operational information is included in the plurality of first memory blocks, a second dedicated main block that stores second operational information is included in the plurality of second memory blocks, a first dedicated replica block being a replica of the first dedicated main block and a second dedicated replica block being a replica of the second dedicated main block, the first dedicated replica block and the second dedicated replica block are included in the plurality of second memory blocks, and the control logic circuit performs an initialization operation based on the first operational information and the second operational information.

BRIEF DESCRIPTION OF THE EXAMPLE EMBODIMENTS

The above and other objects and features of the present disclosure will become apparent by describing in detail embodiments thereof with reference to the accompanying drawings.

FIG. 13 is a diagram for describing an operation of an address replacing circuit of FIG. 12.

FIGS. 14A to 14C are diagrams for describing a change of a correspondence relationship between an internal address and a physical address according to replacement of a memory block.

FIGS. 18A and 18B are diagrams for describing an operation of a nonvolatile memory device of FIG. 2.

DETAILED DESCRIPTION

Below, example embodiments of the present disclosure will be described in detail and clearly to such an extent that an ordinary one in the art easily implements the invention.

Figure 1:
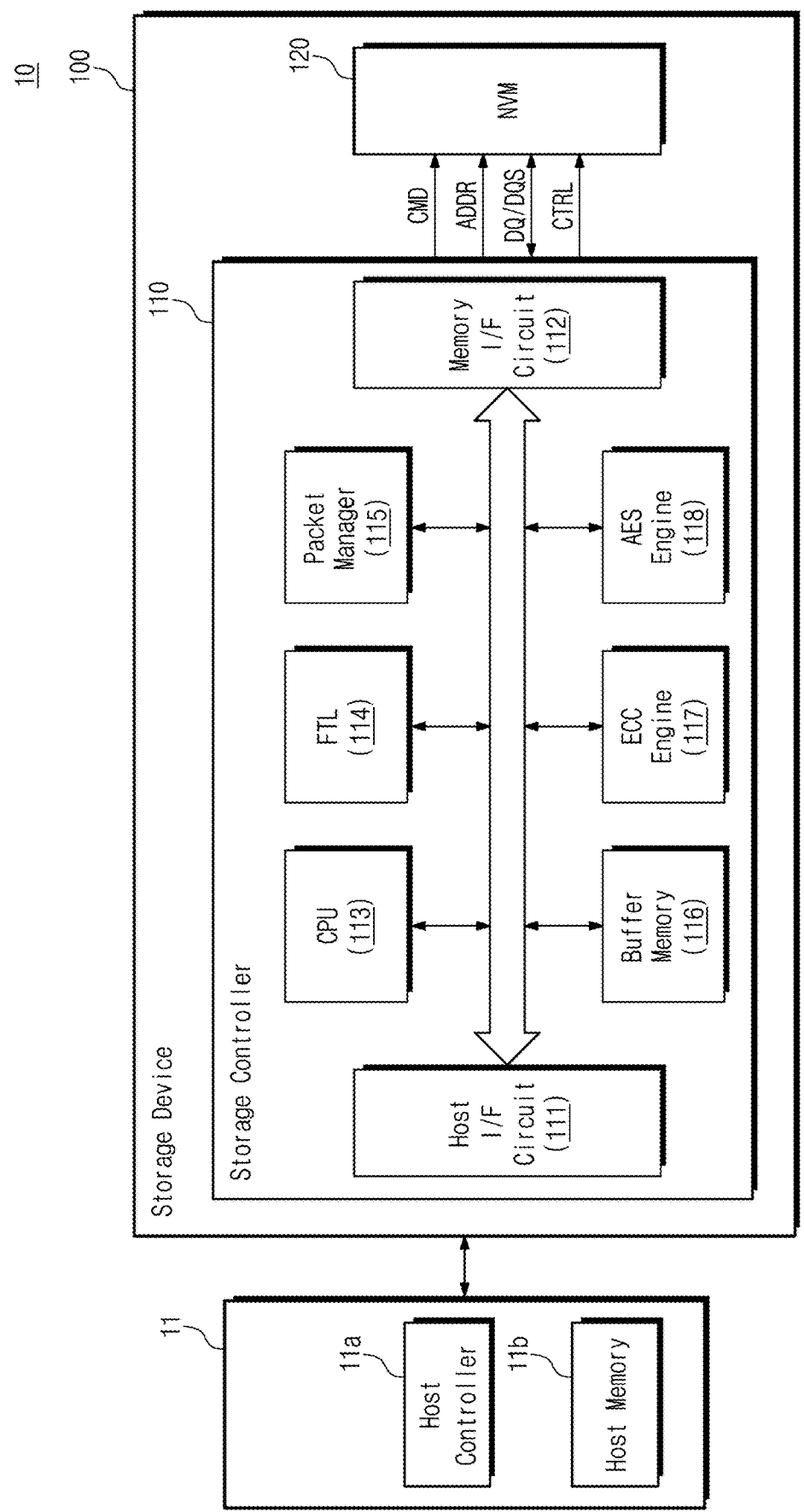
FIG. 1 is a block diagram illustrating a host-storage system according to some example embodiments of the present disclosure.

FIG. 1 is a block diagram illustrating a host-storage system according to some example embodiments of the present disclosure. Referring to FIG. 1, a host-storage system 10 may include a host 11 and a storage device 100. Also, the storage device 100 may include a storage controller 110 and a nonvolatile memory device (NVM) 120. Also, according to some example embodiments of the present disclosure, the host 11 may include a host controller 11a and a host memory 11b. The host memory 11b may function as (or alternatively, be configured as) a buffer memory for temporarily storing data to be sent to the storage device 100 or data sent from the storage device 100.

The storage device 100 may include storage mediums for storing data depending on a request from the host 11. As an example, the storage device 100 may include at least one of a solid state drive (SSD), an embedded memory, and a removable external memory. In the case where the storage device 100 is an SSD, the storage device 100 may be a device complying with the non-volatile memory express (NVMe) standard. In the case where the storage device 100 is an embedded memory or an external memory, the storage device 100 may be a device complying with the universal flash storage (UFS) or embedded multi-media card (eMMC) standard. Each of (or at least one of) the host 11 and the storage device 100 may generate a packet complying with a standard protocol applied thereto and may send the generated packet.

When the nonvolatile memory device 120 of the storage device 100 includes a flash memory, the flash memory may include a two-dimensional (2D) NAND flash memory array or a three-dimensional (3D) (or vertical) NAND (VNAND) memory array. As another example, the storage device 100 may be implemented with various kinds of different nonvolatile memories. For example, the storage device 100 may include a magnetic RAM (MRAM), a spin-transfer torque MRAM (STT-MRAM), a conductive bridging RAM (CBRAM), a ferroelectric RAM (FeRAM), a phase change RAM (PRAM), a resistive RAM (RRAM), or at least one of various kinds of different memories.

According to an example embodiment, the host controller 11a and the host memory 11b may be implemented with separate semiconductor chips. Alternatively, in some example embodiments, the host controller 11a and the host memory 11b may be implemented in the same semiconductor chip. As an example, the host controller 11a may be one of a plurality of modules included in an application processor; in this case, the application processor may be implemented with a system on chip (SoC). Also, the host memory 11b may be an embedded memory included in the application processor or may be a nonvolatile memory or a memory module disposed outside the application processor.

The host controller 110 may manage an operation of storing data (e.g., write data) of a buffer area of the host memory 11b in the nonvolatile memory device 120 or storing data (e.g., read data) of the nonvolatile memory device 120 in the buffer area. For example, the host controller 110 may cause the write data to be stored in the nonvolatile memory device 120 and cause the read data to be stored in the buffer area of the host memory 11b.

The storage controller 110 may include a host interface 111, a memory interface (I/F) circuit 112, a central processing unit (CPU) 113. Also, the storage controller 110 may further include a flash translation layer (FTL) 114, a packet manager 115, a buffer memory 116, an error correction code (ECC) engine 117, an advanced encryption standard (AES) engine 118. The storage controller 110 may further include a working memory (not illustrated) onto which the flash translation layer 114 is loaded, and data write and read operations of the nonvolatile memory device 120 may be controlled as the CPU 113 executes the flash translation layer 114.

The host interface (I/F) circuit 111 may exchange packets with the host 11. The packet that is sent from the host 11 to the host interface 111 may include a command, data to be written in the nonvolatile memory device 120, and the like and the packet that is sent from the host interface 111 to the host 11 may include a response to the command, data read from the nonvolatile memory device 120, and the like. The memory interface 112 may provide the nonvolatile memory device 120 with data to be written in the nonvolatile memory device 120, or may receive data read from the nonvolatile memory device 120. The memory interface 112 may be implemented to comply with the standard such as Toggle or ONFI (Open NAND Flash Interface).

For example, the memory interface 112 may send a command CMD, an address ADDR, and a control signal CTRL to the nonvolatile memory device 120 and may exchange a data signal DQ including data and a data strobe signal DQS with the nonvolatile memory device 120.

The flash translation layer 114 may perform various functions (or operations) such as address mapping, wear-leveling, and garbage collection. The address mapping operation refers to an operation of translating a logical address received from the host 11 into a physical address to be used to actually store data in nonvolatile memory device 120. The wear-leveling operation, which is a technology for allowing blocks in the nonvolatile memory device 120 to be used uniformly such that excessive degradation of a specific block is hindered or prevented, may be implemented through a firmware technology for balancing erase counts of physical blocks, in an example embodiment. The garbage collection operation refers to a technology for securing an available capacity of the nonvolatile memory device 120 through a way to erase an existing block after copying valid data of the existing block to a new block.

The packet manager 115 may generate a packet complying with a protocol of an interface agreed with the host 11 or may parse various kinds of information from the packet received from the host 11. Also, the buffer memory 116 may temporarily store data to be written in the nonvolatile memory device 120 or data read from the nonvolatile memory device 120. The buffer memory 116 may be a component provided within the storage controller 110; however, it may be possible to dispose the buffer memory 116 outside the storage controller 110.

The ECC engine 117 may perform an error detection and correction function on data read out from the nonvolatile memory device 120. In detail, the ECC engine 117 may generate parity bits for write data to be written in the nonvolatile memory device 120, and the parity bits thus generated may be stored in the nonvolatile memory device 120 together with the write data. When data are read from the nonvolatile memory device 120, the ECC engine 117 may correct an error of read data by using parity bits read from the nonvolatile memory device 120 together with the read data and may output the error-corrected read data.

The AES engine 118 may perform at least one of an encryption operation and a decryption operation on data input to the storage controller 110 by using a symmetric-key algorithm.

Figure 2:
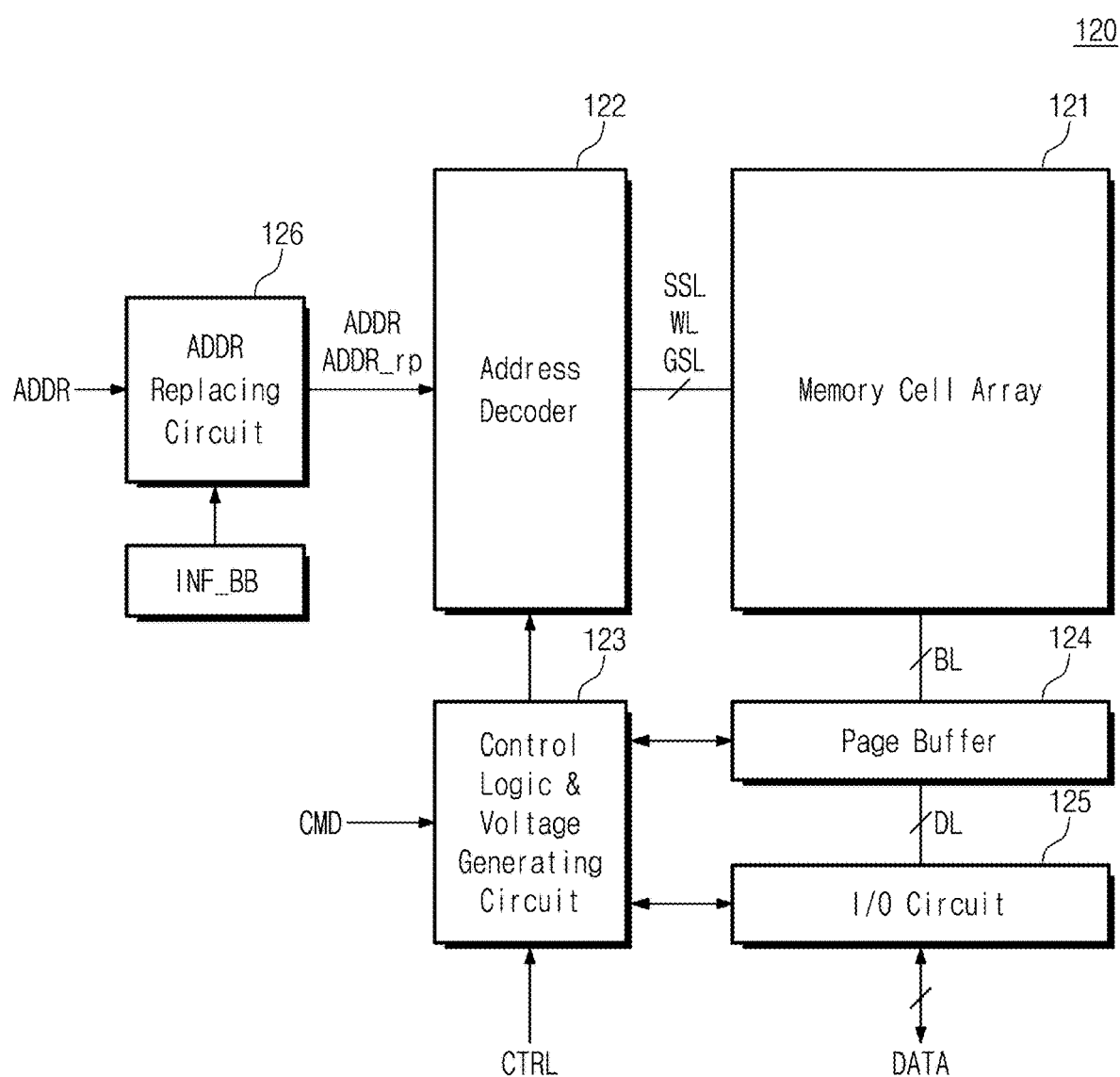
FIG. 2 is a block diagram illustrating a nonvolatile memory device of FIG. 1.

FIG. 2 is a block diagram illustrating a nonvolatile memory device of FIG. 1. Referring to FIGS. 1 and 2, the nonvolatile memory device 120 may include a memory cell array 121, an address decoder 122, a control logic and voltage generating circuit (hereinafter referred to as a "control logic circuit") 123, a page buffer circuit 124, an input/output (I/O) circuit 125, and an address replacing circuit 126.

The memory cell array 121 may include a plurality of memory blocks. Each of (or at least one of) the plurality of memory blocks may include a plurality of cell strings, and each of (or at least one of) the plurality of cell strings may be connected with a plurality of bit lines BL. Each of (or at least one of) the plurality of cell strings may include a plurality of cell transistors, which are connected with string selection lines SSL, word lines WL, and ground selection lines GSL. A structure of a memory block will be described in detail with reference to FIG. 3.

The address decoder 122 may be connected with the memory cell array 121 through the string selection lines SSL, the word lines WL, and the ground selection lines GSL. The address decoder 122 may decode the address ADDR received from the storage controller 110 and may control the string selection lines SSL, the word lines WL, and the ground selection lines GSL based on a decoding result.

The control logic circuit 123 may control various components of the nonvolatile memory device 120 in response to the command CMD and the control signal CTRL received from the storage controller 110. The control logic circuit 123 may generate various operating voltages necessary for the nonvolatile memory device 120 to operate. For example, the various operating voltages may include a plurality of program voltages, a plurality of verify voltages, a plurality of pass voltages, a plurality of read voltages, a plurality of erase voltages, and a plurality of erase verify voltages.

The page buffer circuit 124 may be connected with the memory cell array 121 through the plurality of bit lines BL. The page buffer circuit 124 may receive data "DATA" from the input/output circuit 125 through data lines DL and may control voltages of the plurality of bit lines BL based on the received data "DATA". Alternatively, the page buffer circuit 124 may read data stored in the memory cell array 121 by sensing voltage changes of the plurality of bit lines BL and may provide the read data to the input/output circuit 125.

The input/output circuit 125 may exchange the data "DATA" with the storage controller 110. In some example embodiments, the input/output circuit 125 may exchange the data "DATA" with the storage controller 110 by using the data signal DQ and the data strobe signal strobe DQS.

The address replacing circuit 126 may be configured to replace the address ADDR received from the storage controller 110 into an actual physical address of a memory block included in the memory cell array 121. For example, the address ADDR received from the storage controller 110 may be a physical address that is managed by the flash translation layer 114. However, the address ADDR may be different from actual physical addresses of the memory blocks of the nonvolatile memory device 120. The reason is that the nonvolatile memory device 120 internally remaps bad blocks to any other normal blocks or spare blocks with regard to an initial defect (e.g., a factory bad block) of the nonvolatile memory device 120. In this case, there is a need (or alternatively, a desire) to replace an address corresponding to a bad block into an address corresponding to a remapped memory block. The address replacing circuit 126 may compare the address ADDR received from the storage controller 110 with bad block information INF_BB; depending on a comparison result, the address replacing circuit 126 may output the address ADDR or may output a remapped address ADDR_rp.

Below, for convenience of description, the address ADDR received from the storage controller 110 is referred to as an "input address", and the address ADDR_rp output from the address replacing circuit 126 is referred to as a "replaced address". In some example embodiments, the replaced address ADDR_rp may be identical to or different from the input address ADDR depending on the comparison with the bad block information INF_BB.

In some example embodiments, the replaced address ADDR_rp may indicate an actual address or a physical address of a memory block of the memory cell array 121, and the address decoder 122 may decode the replaced address ADDR_rp from the address replacing circuit 126 and may control voltages of the string selection lines SSL, the word lines WL, and the ground selection lines GSL. That is, the input address ADDR may be replaced into the replaced address ADDR_rp through the address replacing circuit 126; in this case, an operation corresponding to the replaced address ADDR_rp is performed.

Figure 3:
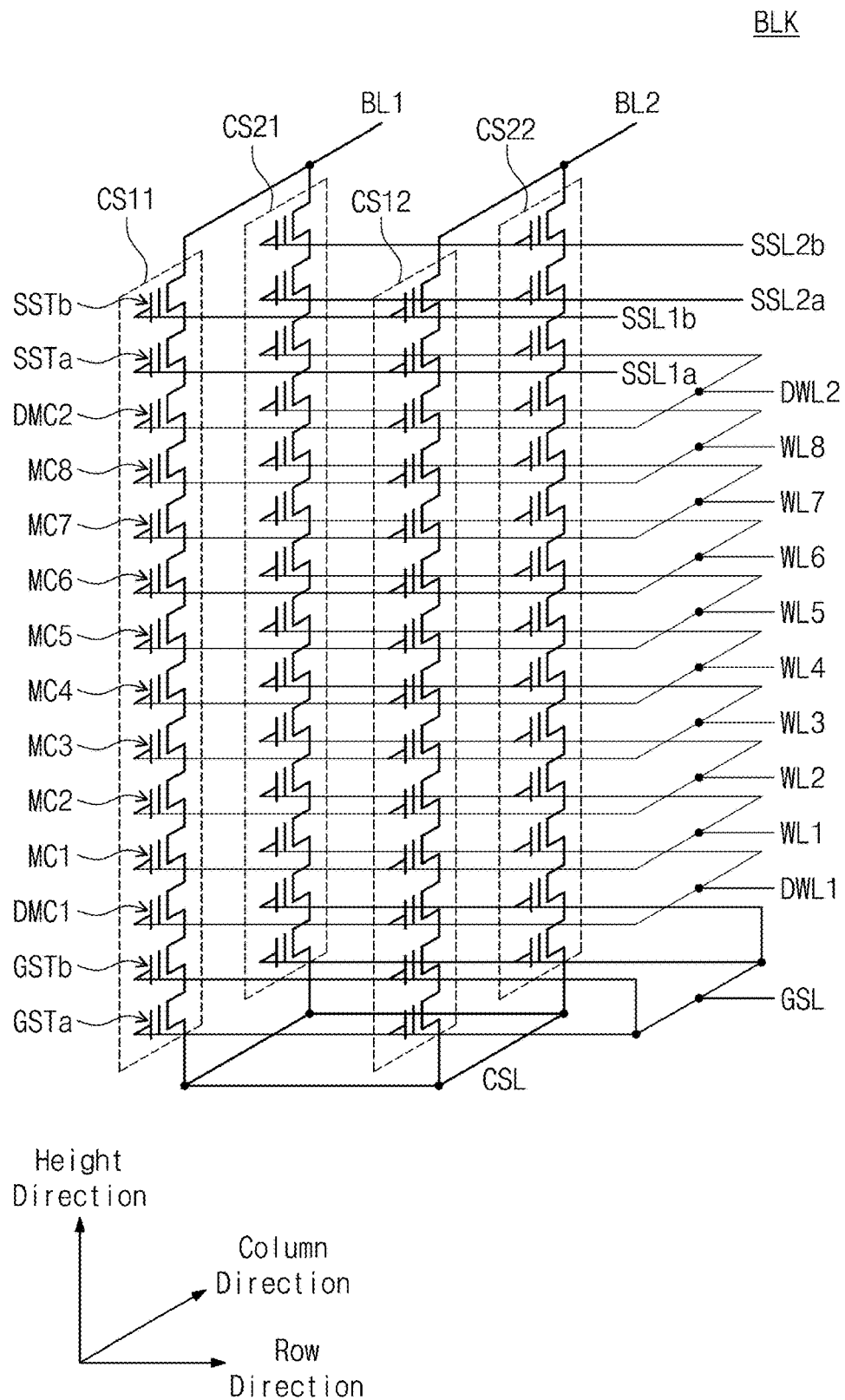
FIG. 3 is a diagram illustrating an example of a memory block included in a memory cell array of FIG. 2.

FIG. 3 is a diagram illustrating an example of a memory block included in a memory cell array of FIG. 2. In some example embodiments, a memory block of a three-dimensional structure will be described with reference to FIG. 3, but the present disclosure is not limited thereto. A memory block according to the present disclosure may have a two-dimensional memory block structure. In some example embodiments, the memory block illustrated in FIG. 3 may be a physical erase unit of the nonvolatile memory device 120. However, the present disclosure is not limited thereto. For example, an erase unit may be changed to a page unit, a word line unit, a sub-block unit, etc.

Referring to FIGS. 2 and 3, a memory block BLK may include a plurality of cell strings CS11, CS12, CS21, and CS22. The plurality of cell strings CS11, CS12, CS21, and CS22 may be arranged in a row direction and a column direction to form rows and columns.

Each of (or at least one of) the plurality of cell strings CS11, CS12, CS21, and CS22 includes a plurality of cell transistors. For example, each of (or at least one of) the plurality of cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In some example embodiments, each of (or at least one of) a plurality of cell transistors included in the cell strings CS11, CS12, CS21, and CS22 may be a charge trap flash (CTF) memory cell.

In each cell string, the plurality of memory cells MC1 to MC8 are serially connected and are stacked in a direction perpendicular (or substantially perpendicular) to a plane defined by the row direction and the column direction, that is, in a height direction. The string selection transistors SSTa and SSTb may be serially connected, and the serially connected string selection transistors SSTa and SSTb may be interposed between the plurality of memory cells MC1 to MC8 and a bit line BL. The ground selection transistors GSTa and GSTb may be serially connected and may be interposed between the plurality of memory cells MC1 to MC8 and a common source line CSL.

In some example embodiments, in each cell string, the first dummy memory cell DMC1 may be interposed between the plurality of memory cells MC1 to MC8 and the ground selection transistors GSTa and GSTb. In some example embodiments, in each cell string, the second dummy memory cell DMC2 may be interposed between the plurality of memory cells MC1 to MC8 and the string selection transistors SSTa and SSTb.

The ground selection transistors GSTa and GSTb of the cell strings CS11, CS12, CS21, and CS22 may be connected in common with a ground selection line GSL. In some example embodiments, ground selection transistors in the same row may be connected with the same ground selection line, and ground selection transistors in different rows may be connected with different ground selection lines. For example, the first ground selection transistors GSTa of the cell strings CS11 and CS12 in the first row may be connected with a first ground selection line, and the first ground selection transistors GSTa of the cell strings CS21 and CS22 in the second row may be connected with a second ground selection line.

In some example embodiments, although not illustrated, ground selection transistors provided at the same height from a substrate (not illustrated) may be connected with the same ground selection line, and ground selection transistors provided at different heights therefrom may be connected with different ground selection lines.

Memory cells of the same height from the substrate or the ground selection transistors GSTa and GSTb are connected in common with the same word line, and memory cells of different heights therefrom are connected with different word lines. For example, the memory cells MC1 to MC8 of the cell strings CS11, CS12, CS21, and CS22 may be connected to first to eighth word lines WL1 to WL8.

String selection transistors, which belong to the same row, from among the first string selection transistors SSTa of the same height are connected to the same string selection line, and string selection transistors belonging to different rows are connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

Likewise, second string selection transistors, which belong to the same row, from among the second string selection transistors SSTb at the same height are connected with the same string selection line, and second string selection transistors in different rows are connected with different string selection lines. For example, the second string selection transistors SSTb of the cell strings CS11 and CS12 in the first row are connected in common with a string selection line SSL1b, and the second string selection transistors SSTb of the cell strings CS21 and CS22 in the second row may be connected in common with a string selection line SSL2b.

In some example embodiments, dummy memory cells of the same height are connected with the same dummy word line, and dummy memory cells of different heights are connected with different dummy word lines. For example, the first dummy memory cells DMC1 are connected with a first dummy word line DWL1, and the second dummy memory cells DMC2 are connected with a second dummy word line DWL2.

In some example embodiments, the memory block BLK illustrated in FIG. 3 is only an example. The number of cell strings may increase or decrease, and the number of rows of cell strings and the number of columns of cell strings may increase or decrease depending on the number of cell strings. Also, the number of cell transistors (e.g., GST, MC, DMC, and SST) in the memory block BLK may increase or decrease, and the height of the memory block BLK may increase or decrease depending on the number of cell transistors (e.g., GST, MC, DMC, and SST). Also, the number of lines (i.e., GSL, WL, DWL, and SSL) connected with cell transistors may increase or decrease depending on the number of cell transistors.

Figure 4:
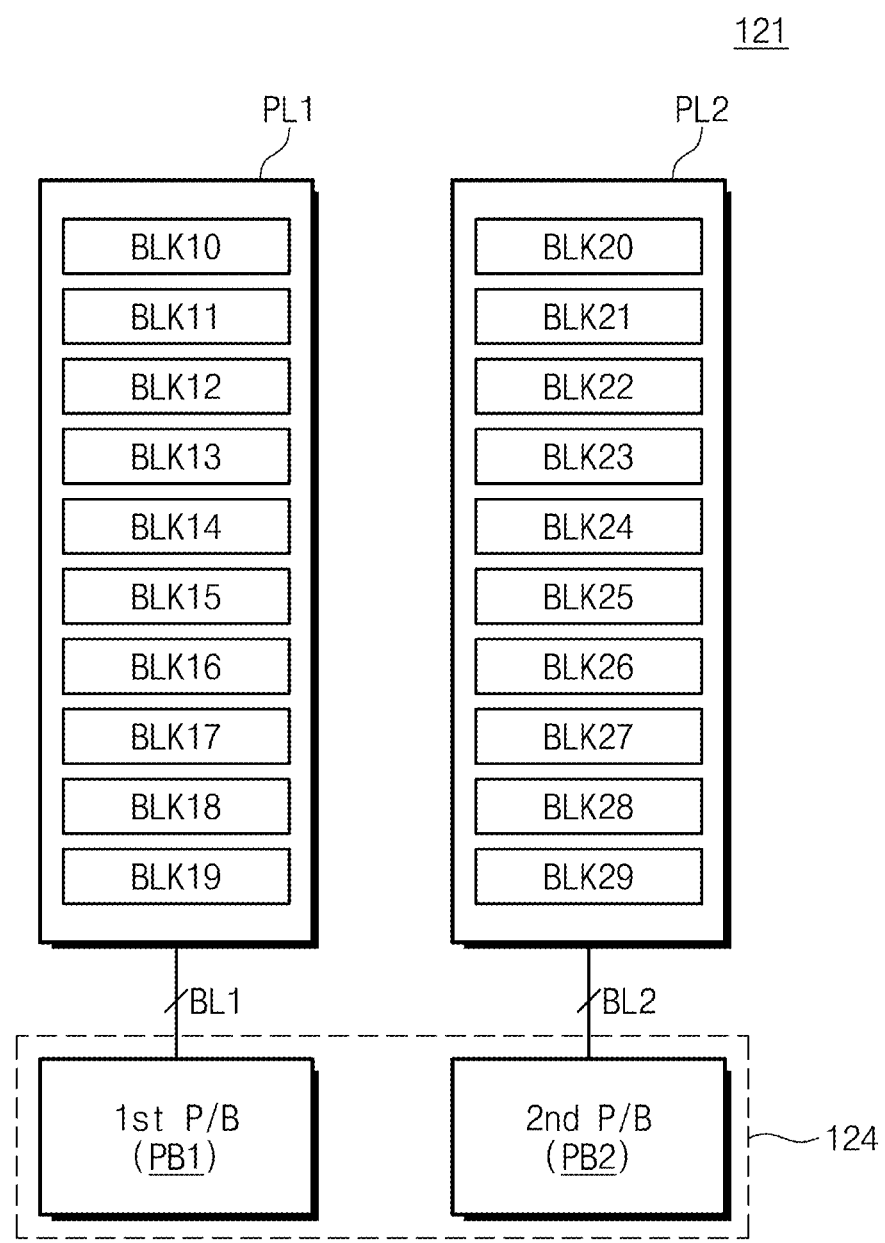
FIG. 4 is a diagram illustrating a plane structure of a memory cell array of FIG. 2.

FIG. 4 is a diagram illustrating a plane structure of a memory cell array of FIG. 2. Below, to describe example embodiment of the present disclosure easily, the description will be given with reference to a 2-plane structure in which the memory cell array 121 of the nonvolatile memory device 120 includes a first plane PL1 and a second plane PL2. However, the present disclosure is not limited thereto. For example, the number of planes included in the nonvolatile memory device 120 may be variously changed.

Referring to FIGS. 2 to 4, the memory cell array 121 of the nonvolatile memory device 120 may include the first plane PL1 and the second plane PL2. The first plane PL1 may include a plurality of memory blocks BLK10 to BLK19, and the second plane PL2 may include a plurality of memory blocks BLK20 to BLK29. Each of (or at least one of) the plurality of memory blocks may have a structure similar to or the same as the structure of the memory block BLK described with reference to FIG. 3.

The plurality of memory blocks BLK10 to BLK19 included in the first plane PL1 may be connected with a first page buffer PB1 of the page buffer circuit 124 through a plurality of first bit lines BL1, and the plurality of memory blocks BLK20 to BLK29 included in the second plane PL2 may be connected with a second page buffer PB2 of the page buffer circuit 124 through a plurality of second bit lines BL2. That is, a plurality of memory blocks included in the same plane may share the same bit lines.

Figure 5:
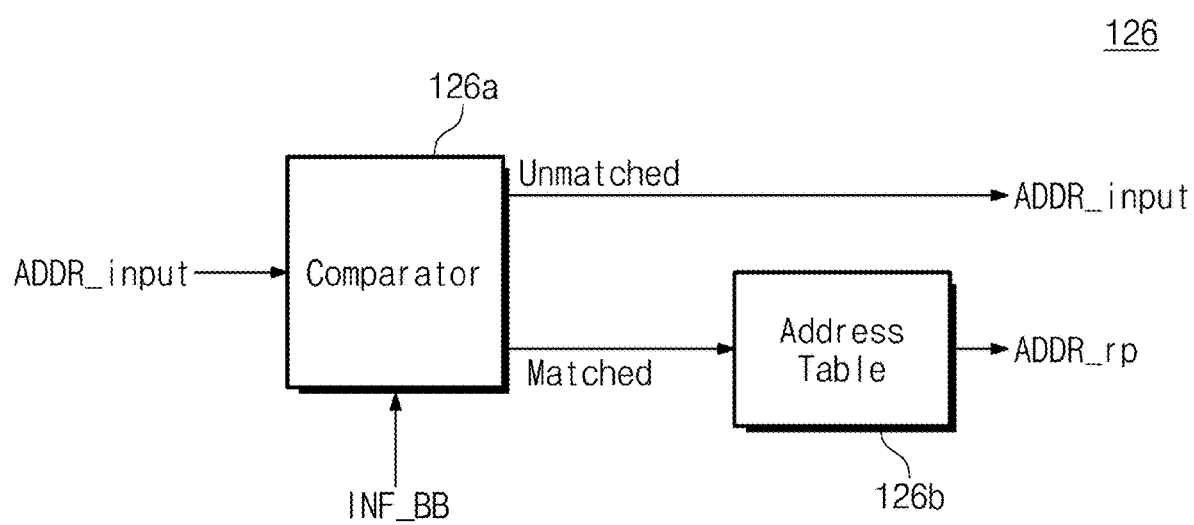
FIG. 5 is a block diagram illustrating an address replacing circuit of FIG. 2.

FIG. 5 is a block diagram illustrating an address replacing circuit of FIG. 2. Referring to FIGS. 2 and 5, the address replacing circuit 126 may include a comparator 126a and an address table 126b.

The comparator 126a may compare an address received from the storage controller 110, for example, an input address ADDR_input with the bad block information INF_BB. In some example embodiments, the bad block information INF_BB may include address information corresponding to a bad block of a plurality of memory blocks included in the memory cell array 121. In some example embodiments, the bad block information INF_BB may include information about a bad block included in an initial defect (i.e., corresponding to a factory bad block) from among a plurality of memory blocks, and may be configured in the process of manufacturing or testing the nonvolatile memory device 120.

The case where a comparison result of the comparator 126a indicates that the input address ADDR_input is not matched with the bad block information INF_BB (i.e., the input address ADDR_input is not included in the bad block information INF_BB) means that a memory block corresponding to the input address ADDR_input is not a bad block; in this case, the input address ADDR_input is output without separate replacement or conversion.

The case where the comparison result of the comparator 126*a* indicates that the input address ADDR_input is matched with the bad block information INF_BB (i.e., the input address ADDR_input is included in the bad block information INF_BB) means that a memory block corresponding to the input address ADDR_input is a bad block; in this case, the input address ADDR_input is replaced or converted into the replaced address ADDR_rp.

For example, it is assumed that the input address ADDR_input indicates a first memory block and the first memory block is a bad block. According to the above assumption, when the first memory block is selected based on the input address ADDR_input, an operation is incapable of being performed normally. In contrast, in the case where the input address ADDR_input is replaced into an address corresponding to a second memory block being a normal block, the nonvolatile memory device 120 may perform an operation on the second memory block, and the operation is capable of being performed normally. The address table 126*b* may include information about the relationship between the input address ADDR_input corresponding to a bad block and the replaced address ADDR_rp indicating a normal block. In some example embodiments, the address table 126*b* may be configured in the process of manufacturing or testing the nonvolatile memory device 120. However, the present disclosure is not limited thereto. For example, the address table 126*b* may be updated (or renewed) during an operation of the nonvolatile memory device 120, under control of the storage controller 110.

Below, to describe example embodiments of the present disclosure easily, the expression "a back block is replaced into any other normal block or spare block" is used. This may mean that, when an input address corresponding to the bad block is received, the input address is replaced or converted such that an operation is performed with respect to the normal block or spare block, not the bad block.

Figure 6:
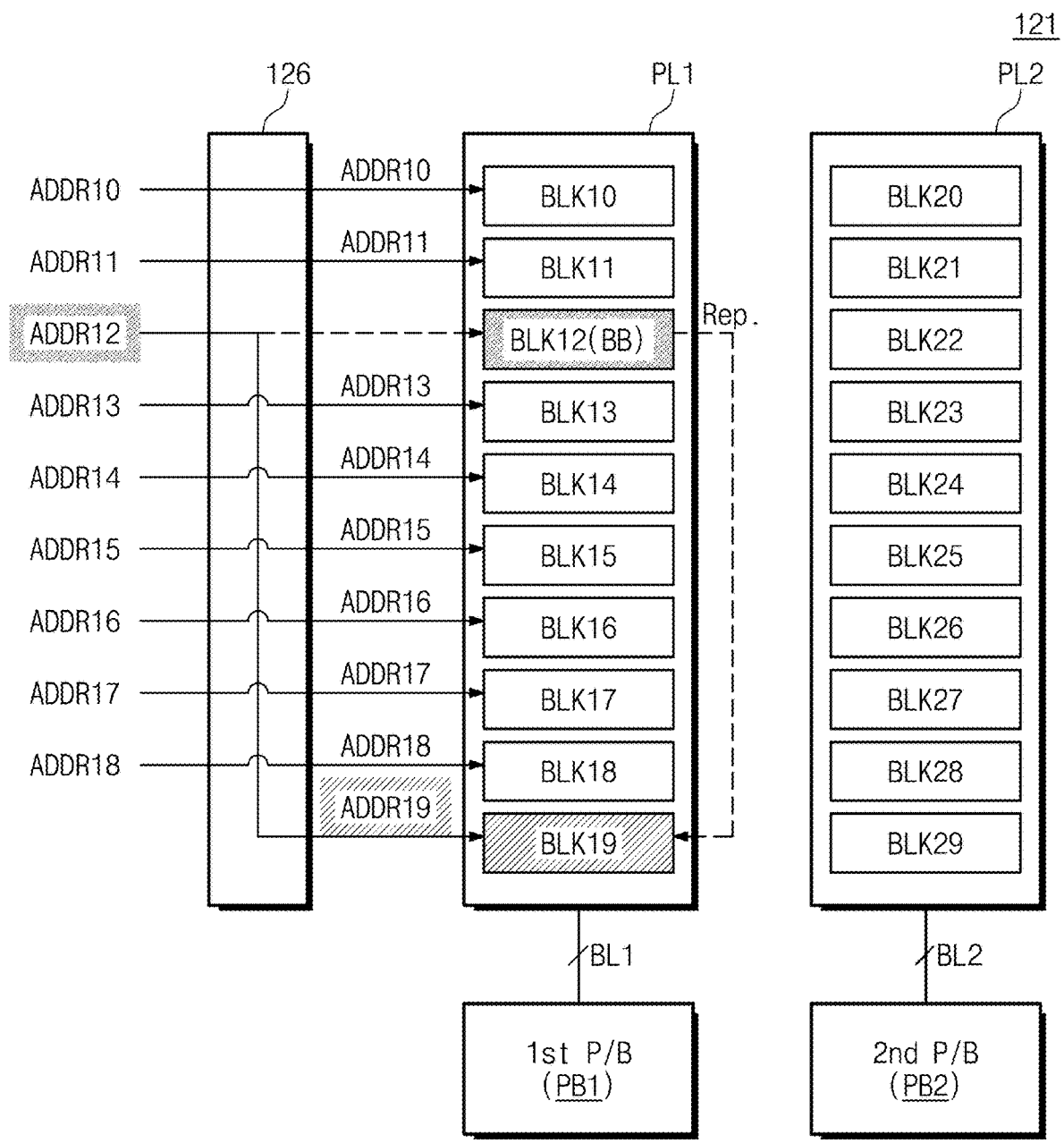
FIGS. 6 and 7 are diagrams for describing an operation of an address replacing circuit of FIG. 5.
Figure 7:
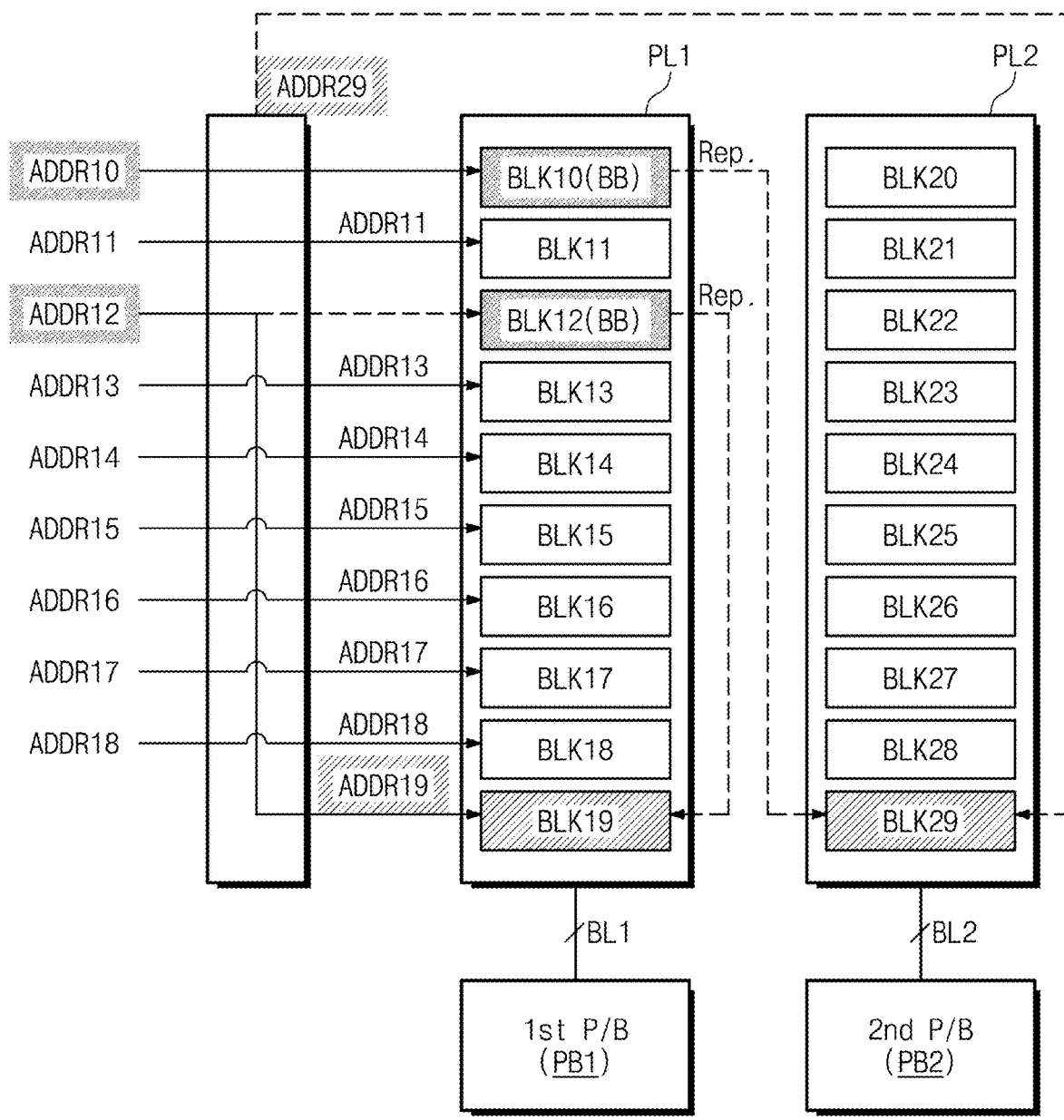

FIGS. 6 and 7 are diagrams for describing an operation of an address replacing circuit of FIG. 5. Referring to FIGS. 1, 4, 5, 6, and 7, the memory cell array 121 of the nonvolatile memory device 120 may include the first and second planes PL1 and PL2, the first plane PL1 may include the plurality of memory blocks BLK10 to BLK19, and the second plane PL2 may include the plurality of memory blocks BLK20 to BLK29. The plurality of memory blocks BLK10 to BLK19 of the first plane PL1 may be connected with the first page buffer PB1 through the plurality of first bit lines BL1, and the plurality of memory blocks BLK20 to BLK29 of the second plane PL2 may be connected with the second page buffer PB2 through the plurality of second bit lines BL2.

In some example embodiments, as illustrated in FIG. 6, the 12th memory block BLK12 of the first plane PL1 may be a bad block (in particular, an initial defect). In this case, as described with reference to FIG. 5, the initial defect of the 12th memory block BLK12 may be detected in the process of manufacturing or testing the nonvolatile memory device 120, and the 12th memory block BLK12 being a bad block may be replaced into the 19th memory block BLK19 of the first plane PL1. In this case, a physical address corresponding to the 12th memory block BLK12 may be included in the bad block information INF_BB, and relationship information of the physical address corresponding to the 12th memory block BLK12 and a physical address corresponding to the 19th memory block BLK19 may be stored in the address table 126*b*.

Afterwards, in a normal operation of the nonvolatile memory device 120, the address replacing circuit 126 may output the replaced address ADDR_rp based on the method described with reference to FIG. 5. For example, when the input address ADDR_input received from the storage controller 110 corresponds to the 12th memory block BLK12 being a bad block (e.g., when ADDR12 is received from the storage controller 110), the address replacing circuit 126 may output an address of ADDR19 corresponding to the 19th memory block BLK19 such that there is accessed the 19th memory block BLK19 being a replaced memory block instead of the 12th memory block BLK12. In this case, the nonvolatile memory device 120 may normally operate by performing the access to the 19th memory block BLK19. When each of addresses (e.g., ADDR10, ADDR11, and ADDR13 to ADDR18) for the remaining normal blocks (e.g., BLK10, BLK11, and BLK13 to BLK18) is received as the input address ADDR_input, the address replacing circuit 126 may output the received input address ADDR_input (i.e., each of ADDR10, ADDR11, and ADDR13 to ADDR18) without separate address replacement or conversion. In this case, the nonvolatile memory device 120 may normally perform the access to a memory block corresponding to the input address ADDR_input.

In some example embodiments, the 19th memory block BLK19 being a replaced memory block may be a spare block that is not managed or identified by the storage controller 110. In this case, the address of ADDR19 corresponding to the 19th memory block BLK19 may not be received as the input address ADDR_input from the storage controller 110.

In the example embodiment of FIG. 6, in the case where the 12th memory block BLK12 included in the first plane PL1 is a bad block, the 12th memory block BLK12 is replaced into the 19th memory block BLK19 included in the same plane, for example, the first plane PL1. In other words, a bad block is replaced into any other memory block or spare block of the same plane. However, the present disclosure is not limited thereto.

For example, as illustrated in FIG. 7, the first plane PL1 may include the 10th memory block BLK10 and the 12th memory block BLK12 as bad blocks. In this case, as in the description given with reference to FIG. 6, the 12th memory block BLK12 may be replaced into the 19th memory block BLK19 of the same plane, for example, the first plane PL1. In contrast, the 10th memory block BLK10 may be replaced into the 29th memory block BLK29 of another plane, for example, the second plane PL2. That is, bad blocks may be replaced into a memory block of another plane as well as a memory block of the same plane.

In this case, as illustrated in FIG. 7, when an address of ADDR10 corresponding to the 10th memory block BLK10 of the first plane PL1 is received as the input address ADDR_input, the address replacing circuit 126 may output an address of ADDR29 corresponding to the 29th memory block BLK29 being a replaced memory block, instead of ADDR10. As such, the nonvolatile memory device 120 may normally operate by performing the access to the 29th memory block BLK29 instead of the 10th memory block BLK10 being a bad block.

In some example embodiments, in the case where a bad block detected in a specific plane is incapable of being replaced into a spare block of the same plane, the detected bad block may be processed as an unavailable block; in this case, the whole available capacity of the nonvolatile memory device 120 may decrease. In contrast, as illustrated in FIG. 7, when a bad block detected in a specific plane is incapable of being replaced into a spare block of the same plane, the detected bad block may be replaced into a spare block or normal block of another plane, and thus, the whole available capacity of the nonvolatile memory device 120 may be maintained.

In some example embodiments, the replacement of the 10th memory block BLK10 being a bad block of the first plane PL1 with the 29th memory block BLK29 of another plane, for example, the second plane PL2 may be determined based on various conditions. For example, various conditions may include a bad block occurrence ratio of the first and second planes PL1 and PL2, a spare memory ratio of the first and second planes PL1 and PL2, an available block ratio of the first and second planes PL1 and PL2, and a characteristic of a detected bad block. For example, when a bad block occurrence ratio of the first plane PL1 is higher than a bad block occurrence ratio of the second plane PL2, at least some of bad blocks detected in the first plane PL1 may be replaced into spare blocks or normal blocks of the second plane PL2. Alternatively, when a spare block ratio or the number of spare blocks of the first plane PL1 is greater than a spare block ratio or the number of spare blocks of the second plane PL2, at least some of bad blocks detected in the first plane PL1 may be replaced into spare blocks or normal blocks of the second plane PL2. Alternatively, when a bad block detected in the first plane PL1 is a dedicated block configured to store specific information, at least some of bad blocks detected in the first plane PL1 may be replaced into spare blocks or normal blocks of the second plane PL2.

Figure 8:
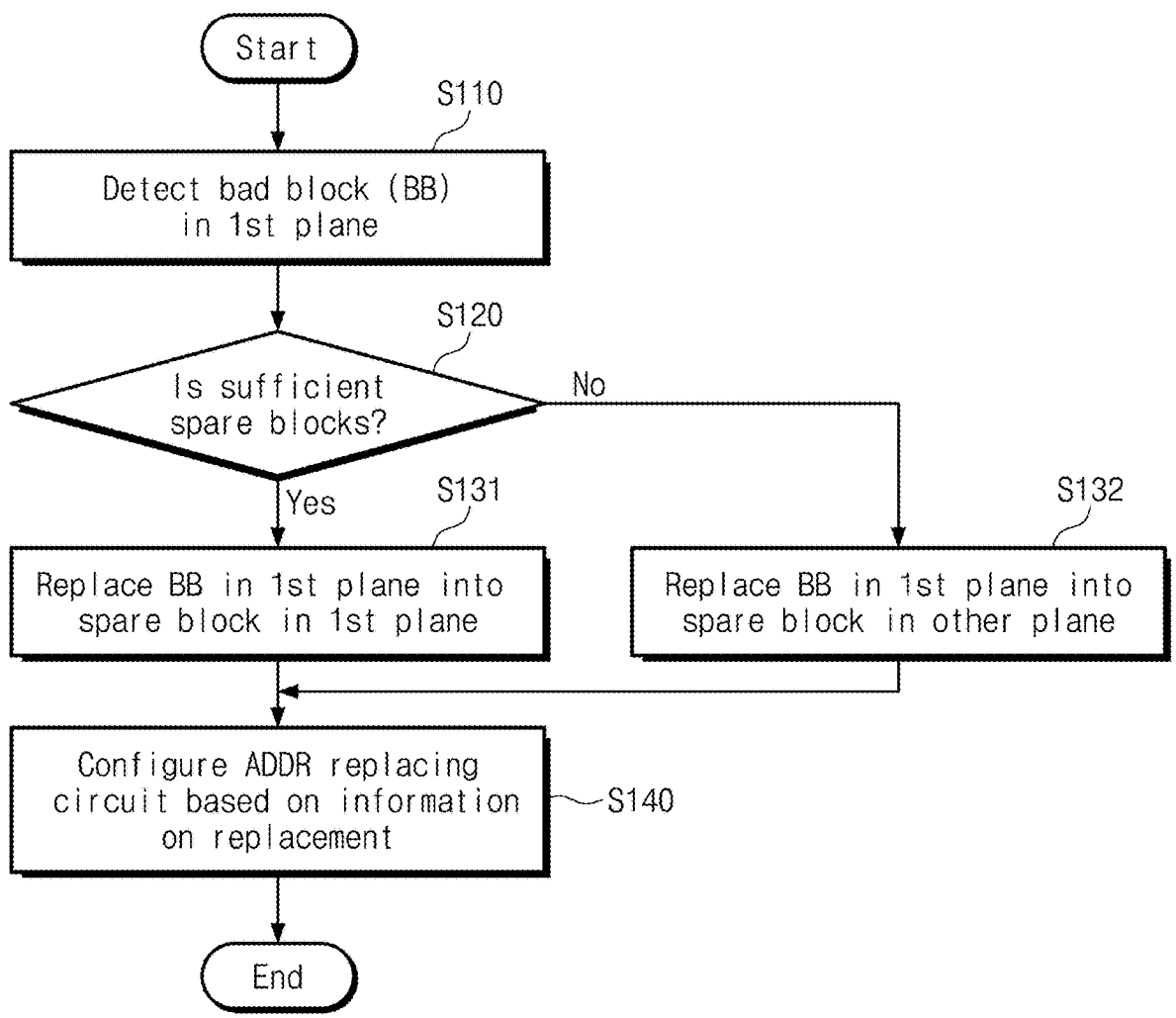
FIG. 8 is a flowchart for describing a method of configuring an address replacing circuit of FIG. 5.

FIG. 8 is a flowchart for describing a method of configuring an address replacing circuit of FIG. 5. In some example embodiments, as an operation according to the flowchart of FIG. 8 is performed by a separate test device in the process of manufacturing or testing the nonvolatile memory device 120, there may be configured or set the address replacing circuit 126. The address replacing circuit 126 may replace or convert an input address into a replacement address depending on the configured state.

Below, for convenience of description, some example embodiments in which a bad block BB is detected in the first plane PL1 and the detected bad block BB is replaced will be described. However, the present disclosure is not limited thereto. For example, block replacement of a bad block detected in another plane may be performed in a similar manner or the same manner.

Referring to FIGS. 2, 4, and 8, in operation S110, the bad block BB of the first plane PL1 may be detected. For example, the nonvolatile memory device 120 may be tested in the process of manufacturing the nonvolatile memory device 120, and the bad block BB of memory blocks included in the nonvolatile memory device 120 may be detected through the test operation.

In operation S120, whether spare blocks of the first plane PL1 in which the bad block BB is detected are sufficient in number may be determined. For example, as described with reference to FIGS. 6 and 7, some memory blocks (e.g., BLK19 and BLK29) of the memory blocks BLK10 to BLK19 and BLK20 to BLK29 included in the first and second planes PL1 and PL2 may be spare blocks. A spare block may have the same structure as the remaining memory blocks, may indicate a memory block that is not managed by the storage controller 110 or is not directly accessed by the storage controller 110, and may be used to replace a bad block.

When spare blocks present in the first plane PL1 in which the bad block BB is detected are sufficient in number, in operation S131, the bad block BB of the first plane PL1 may be replaced into a spare block of the same plane, for example, the first plane PL1.

When spare blocks present in the first plane PL1 in which the bad block BB is detected are insufficient in number (e.g., when the number of bad blocks BB detected in the first plane PL1 is more than the number of spare blocks of the first plane PL1), in operation S132, the bad block BB of the first plane PL1 may be replaced into a spare block of another plane, for example, the second plane PL2.

In operation S140, the address replacing circuit 126 may be configured based on replacement information according to operation S131 and operation S132. For example, information about the bad block BB may be stored as the bad block information INF_BB, and the address table 126*b* may be set based on replacement information in operation S131 or operation S132. The address replacing circuit 126 may operate based on the configured information as described with reference to FIGS. 6 and 7.

Figure 9:
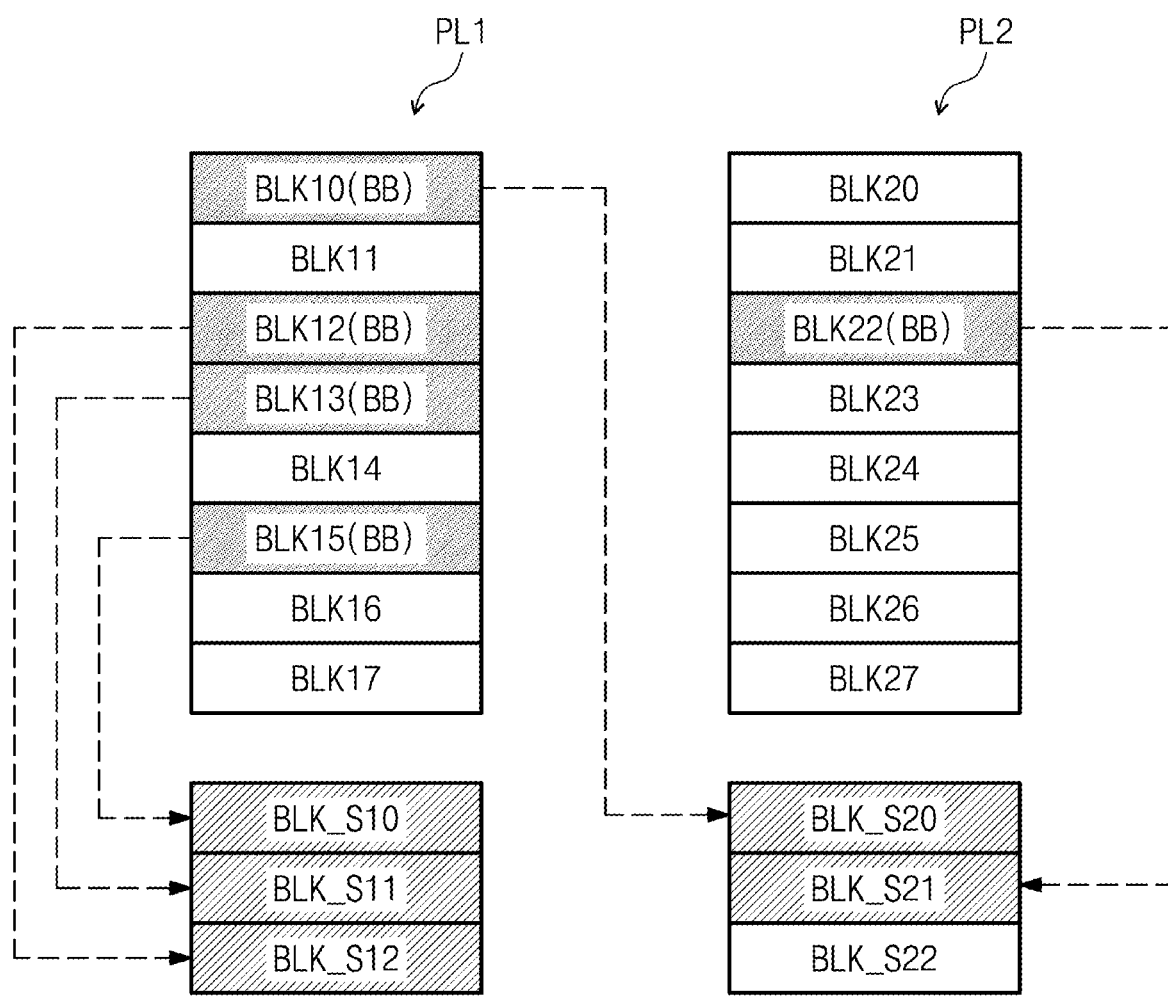
FIG. 9 is a diagram for describing an operation according to the flowchart of FIG. 8.

FIG. 9 is a diagram for describing an operation according to the flowchart of FIG. 8. Referring to FIGS. 2, 8, and 9, the first plane PL1 may include a plurality of memory blocks BLK10 to BLK17 and a plurality of spare blocks BLK_S10 to BLK_S12, and the second plane PL2 may include a plurality of memory blocks BLK20 to BLK27 and a plurality of spare blocks BLK_S20 to BLK_S22.

As illustrated in FIG. 9, the memory blocks BLK10, BLK12, BL13, and BLK15 of the plurality of memory blocks BLK10 to BLK17 of the first plane PL1 may be the bad blocks BB, and the memory block BLK22 of the plurality of memory blocks BLK20 to BLK27 of the second plane PL2 may be detected to be the bad block BB. Because the number of spare blocks of the first plane PL1 is "3", three bad blocks (e.g., BLK12, BLK13, and BLK15) of the bad blocks BLK10, BLK12, BLK13, and BLK15 of the first plane PL1 may be respectively replaced into the three spare blocks BLK_S12, BLK_S11, and BLK_S10. In this case, because all the spare blocks BLK_S10 to BLK_S12 of the first plane PL1 are used, the remaining bad block (e.g., BLK10) of the first plane PL1 may be replaced into a spare block (e.g., BLK_S20) of another plane, for example, the second plane PL2. The bad block BLK22 of the second plane PL2 may be replaced into a spare block (e.g., BLK_S21) of the second plane PL2.

Information about the bad blocks BLK10, BLK12, BLK13, BLK15, and BLK22 of the first and second planes PL1 and PL2 may be stored as the bad block information INF_BB or may be managed by using the bad block information INF_BB, and a correspondence relationship between bad blocks and spare blocks may be stored or managed in the address table 126*b*.

As described above, in the example embodiment in which bad blocks are replaced into spare blocks of the same plane, in the case where the number of bad blocks detected in the first plane PL1 is more than the number of spare blocks of the first plane PL1, at least one of the bad blocks detected in the first plane PL1 may fail to be replaced into a spare block of the first plane PL1. In contrast, according to some example embodiments of the present disclosure, at least one of bad blocks may be replaced into a spare block or normal block of another plane. In this case, the capacity of the nonvolatile memory device 120 may be hindered or prevented from being decreased due to an unavailable bad block.

Figure 10:
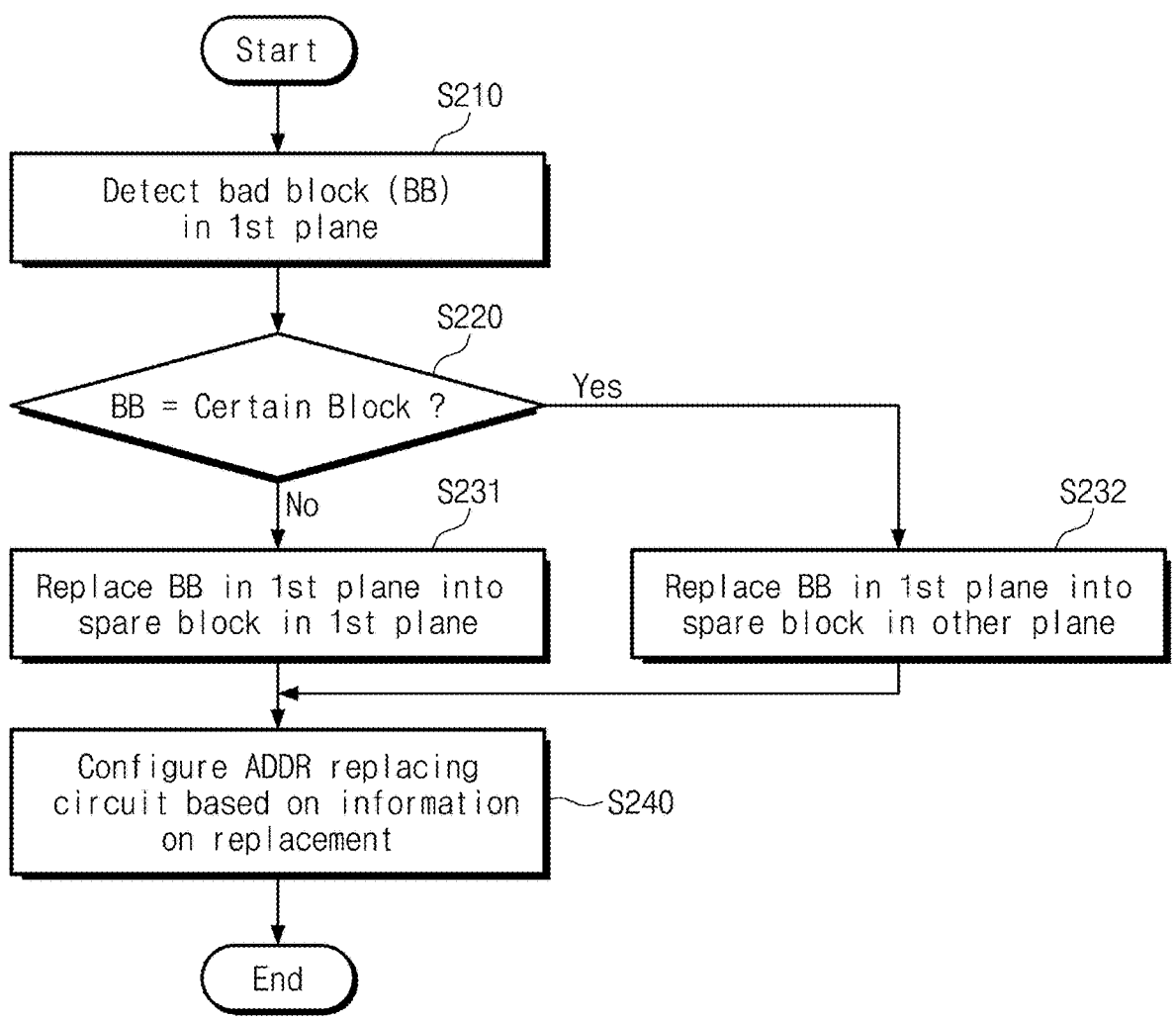
FIG. 10 is a flowchart for describing a method of configuring an address replacing circuit of FIG. 5.

FIG. 10 is a flowchart for describing a method of configuring an address replacing circuit of FIG. 5. In some example embodiments, as an operation according to the flowchart of FIG. 10 is performed by a separate test device in the process of manufacturing or testing the nonvolatile memory device 120, there may be configured or set the address replacing circuit 126. The address replacing circuit 126 may replace or convert an input address into a replacement address depending on the configured state.

Below, for convenience of description, some example embodiments in which the bad block BB is detected in the first plane PL1 and the detected bad block BB is replaced will be described. However, the present disclosure is not limited thereto. For example, block replacement of a bad block detected in another plane may be performed in a similar manner or the same manner.

In operation S210, the bad block BB of the first plane PL1 may be detected. Operation S210 is similar to operation S110 of FIG. 8, and thus, additional description will be omitted to avoid redundancy.

In operation S220, whether the detected bad block BB is a certain block may be determined. For example, the nonvolatile memory device 120 may require (or alternatively, it may be desirable to have) various operational information optimized (or alternatively, improved), in an initialization operation or reset operation. Various operational information may be stored in a physically designated certain block. Below, as will be described in detail with reference to FIG. 11, a single-plane operation may be performed on the certain block.

When the detected bad block BB is not the certain block, in operation S231, the bad block BB of the first plane PL1 may be replaced into a spare block of the same plane, for example, the first plane PL1.

When the detected bad block BB is the certain block, in operation S232, the bad block BB of the first plane PL1 may be replaced into a spare block of another plane, for example, the second plane PL2.

In operation S240, the address replacing circuit 126 may be configured based on the replacement information. Operation S240 is similar to operation S140 of FIG. 8, and thus, additional description will be omitted to avoid redundancy.

Figure 11:
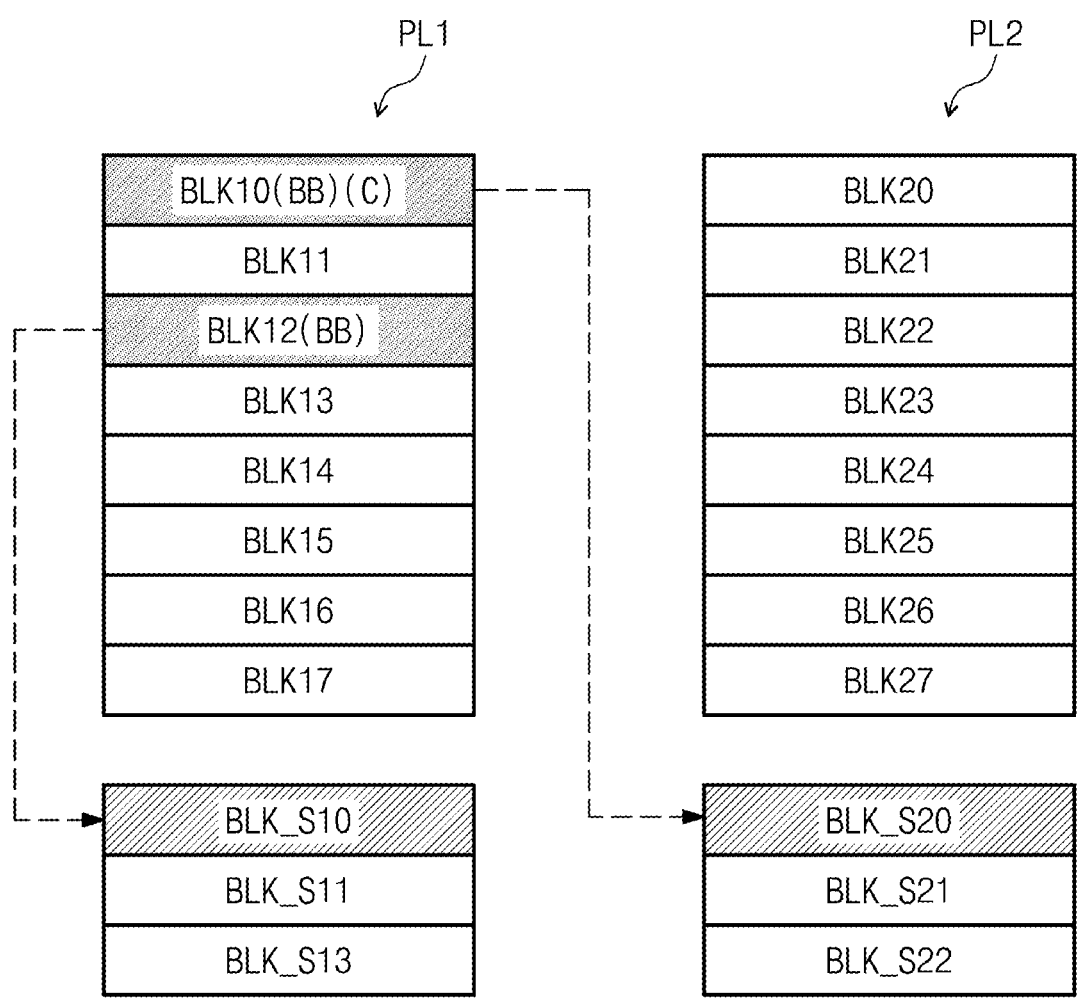
FIG. 11 is a diagram for describing an operation according to the flowchart of FIG. 10.

FIG. 11 is a diagram for describing an operation according to the flowchart of FIG. 10. Referring to FIGS. 2, 10, and 11, the first plane PL1 may include the plurality of memory blocks BLK10 to BLK17 and the plurality of spare blocks BLK_S10 to BLK_S12, and the second plane PL2 may include the plurality of memory blocks BLK20 to BLK27 and the plurality of spare blocks BLK_S20 to BLK_S22.

As illustrated in FIG. 11, the 10th and 12th memory blocks BLK10 and BLK12 of the first plane PL1 may be detected to be the bad blocks BB. In this case, the 12th memory block BLK12 being the bad block BB may be replaced into a spare block (e.g., BLK_S10) of the same plane, for example, the first plane PL1. In contrast, the 10th memory block BLK10 may be a certain block "C". For example, the 10th memory block BLK10 may be a dedicated block configured to store firmware core or metadata of the storage device 100 or to store operational information of the nonvolatile memory device 120. In the case where the 10th memory block BLK10 being the certain block "C" is the bad block BB, the 10th memory block BLK10 may be replaced into a spare block (e.g., BLK_S20) of the another plane, for example, the second plane PL2.

As described above, in the case where a certain block is a bad block, the certain block may be replaced into a spare block of another plane, and thus, an available capacity of the nonvolatile memory device 120 may increase.

In some example embodiments, as described above, the nonvolatile memory device 120 may include the first and second planes PL1 and PL2. In this case, the nonvolatile memory device 120 may perform a multi-plane operation. The multi-plane operation indicates an operation in which an operation associated with one of memory blocks included in the first plane PL1 and an operation associated with one of memory blocks included in the second plane PL2 are performed at the same time or in parallel. That is, through the multi-plane operation, operations associated with two memory blocks may be performed at the same time or in parallel, and thus, an operating speed of the nonvolatile memory device 120 may be improved.

For example, the multi-plane operation may be performed on the 12th memory block BLK12 of the first plane PL1 and the 22nd memory block BLK22 of the second plane PL2. In this case, because the 12th memory block BLK12 of the first plane PL1 is the bad block BB and is replaced into the spare block BLK_S10 of the same plane, for example, the first plane PL1, the multi-plane operation may be normally performed on the spare block BLK_S10 of the first plane PL1 and the 22nd memory block BLK22 of the second plane PL2.

In contrast, the multi-plane operation may not be performed on the 10th memory block BLK10 of the first plane PL1 and one of memory blocks of the second plane PL2. The reason is that, because the 10th memory block BLK10 is replaced into the spare block BLK_S20 of the second plane PL2, operations associated with two memory blocks of the second plane PL2 should be performed but the operations associated with the two memory blocks of the second plane PL2 are incapable of being performed at the same time. However, as described above, the 10th memory block BLK10 of the first plane PL1 may be the certain block "C" or the dedicated block. In the operation of the nonvolatile memory device 120 or the storage device 100, an operation associated with the certain block "C" may be performed only through the single-plane operation, not the multi-plane operation. That is, because the operation associated with the 10th memory block BLK10 of the first plane PL1 is performed only through the single-plane operation, even though the 10th memory block BLK10 is replaced into a spare block of another plane, for example, the second plane PL2, the reduction of performance of the nonvolatile memory device 120 may not occur.

In some example embodiments, the description is given as the certain block "C" or dedicated block is a dedicated block configured to store firmware code or metadata of the storage device 100 or to store operational information of the nonvolatile memory device 120, but the present disclosure is not limited thereto. For example, the certain block "C" or dedicated block may refer to various memory blocks that are not used in the multi-plane operation of the nonvolatile memory device 120.

Figure 12:
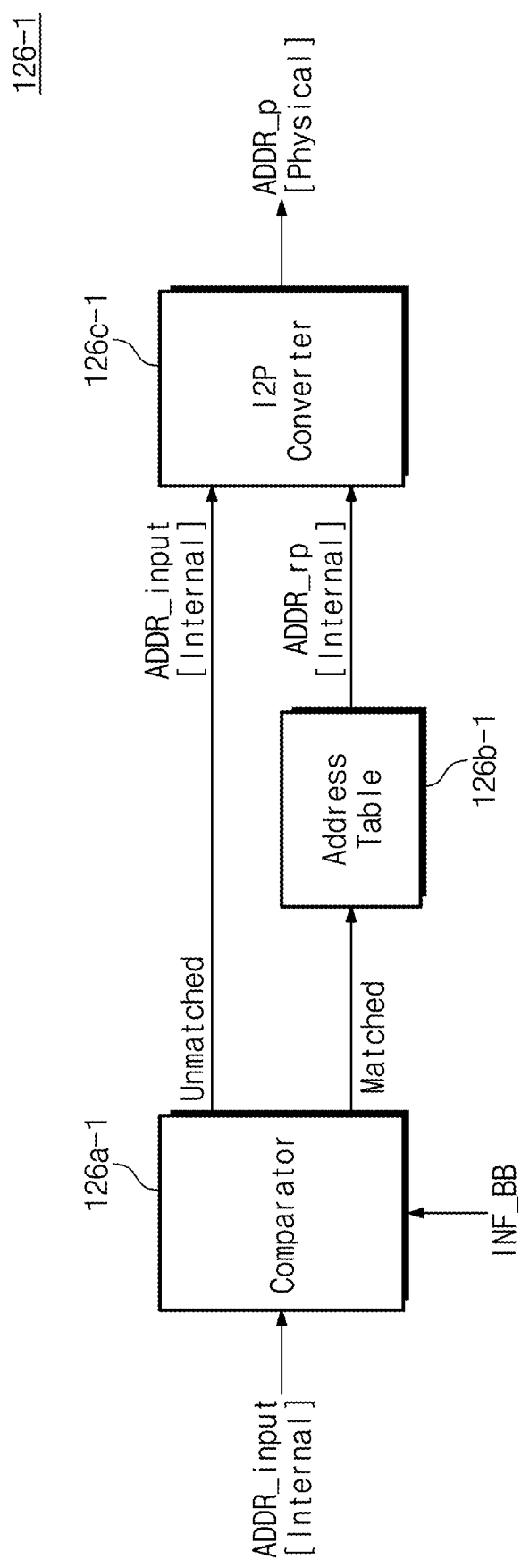
FIG. 12 is a block diagram illustrating an address replacing circuit of FIG. 2.

FIG. 12 is a block diagram illustrating an address replacing circuit of FIG. 2. Referring to FIGS. 2 and 12, an address replacing circuit 126-1 may include a comparator 126a-1, an address table 126b-1, and an internal to physical (I2P) converter 126c-1.

In some example embodiments, the input address ADDR_input received from the storage controller 110 may be an internal address, and the address ADDR_p output from the address replacing circuit 126-1 may be a physical address indicating a physical location of an actual memory block. For example, as described with reference to FIG. 1, the flash translation layer 114 of the storage controller 110 may perform the address mapping operation for converting a logical address received from the host 11 into a physical address of the nonvolatile memory device 120. In this case, the physical address converted by the flash translation layer 114 may be the input address ADDR_input input to the address replacing circuit 126-1 of the nonvolatile memory device 120. In some example embodiments, the input address ADDR_input may be identical to or different from an actual address of a memory block. That is, the input address ADDR_input may indicate an address of the nonvolatile memory device 120, which is capable of being managed by the flash translation layer 114 of the storage controller 110. As such, in the specification, to describe an embodiment easily, it is assumed that the input address ADDR_input is an internal address.

The comparator 126a-1 may compare the input address ADDR_input and the bad block information INF_BB. When a comparison result of the comparator 126a-1 indicates that the input address ADDR_input is not matched with the bad block information INF_BB, the address table 126b-1 may convert and output the input address ADDR_input into the replaced address ADDR_rp.

Functions and operations of the comparator 126a-1 and the address table 126b-1 are similar to or the same as the functions and operations of the comparator 126a and the address table 126b described with reference to FIG. 5 except that the input address ADDR_input and the replaced address ADDR_rp are internal addresses, and thus, additional description will be omitted to avoid redundancy.

The I2P converter 126c-1 may convert the input address ADDR_input or the replaced address ADDR_rp, that is, the internal address into the physical address ADD_p. In some example embodiments, the internal address may be identical to or different from the physical address ADD_p.

FIG. 13 is a diagram for describing an operation of an address replacing circuit of FIG. 12. An operation of the I2P converter 126c-1 will be described with reference to FIG. 13. Referring to FIGS. 2, 4, 12, and 13, a plurality of internal addresses ADDR_i10 to ADDR_i17 and a plurality of physical addresses ADDR_p10 to ADDR_p17 may be allocated to the plurality of memory blocks BLK10 to BLK19 of the first plane PL1. A plurality of internal addresses ADDR_i20 to ADDR_i27 and a plurality of physical addresses ADDR_p20 to ADDR_p27 may be allocated to the plurality of memory blocks BLK20 to BLK27 of the second plane PL2.

The plurality of internal addresses ADDR_i10 to ADDR_i17 and ADDR_i20 to ADDR_i27 may be addresses that are used for the flash translation layer 114 of the storage controller 110 to select the plurality of memory blocks BLK10 to BLK17 and BLK20 to BLK27, and the plurality of physical addresses ADDR_p10 to ADDR_p17 and ADDR_p20 to ADDR_p27 may be addresses for actually selecting the plurality of memory blocks BLK10 to BLK17 and BLK20 to BLK27. That is, a correspondence relationship between internal addresses and physical addresses may be set as illustrated in FIG. 13. However, the correspondence relationship may be changed through an operation method to be described with reference to FIGS. 14A to 14C. In this case, a memory block corresponding to an internal address received from the storage controller 110 may be different from a memory block that is actually accessed.

Figure 14C:
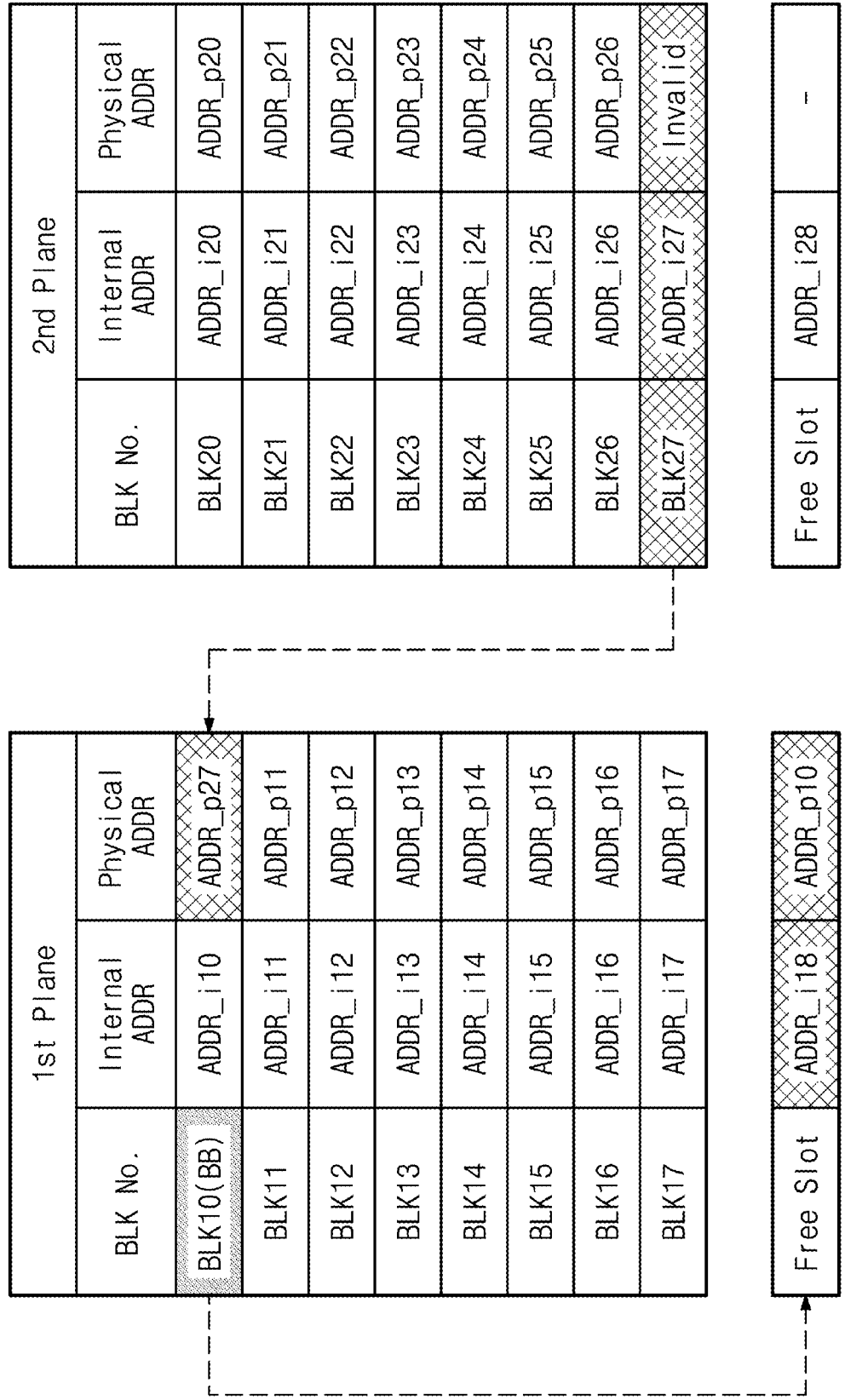

FIGS. 14A to 14C are diagrams for describing a change of a correspondence relationship between an internal address and a physical address according to replacement of a memory block. Referring to FIGS. 14A to 14C, the plurality of internal addresses ADDR_i10 to ADDR_i17 and the plurality of physical addresses ADDR_p10 to ADDR_p17 may be allocated to the plurality of memory blocks BLK10 to BLK17 of the first plane PL1. The plurality of internal addresses ADDR_i20 to ADDR_i27 and the plurality of physical addresses ADDR_p20 to ADDR_p27 may be allocated to the plurality of memory blocks BLK20 to BLK27 of the second plane PL2.

In some example embodiments, as illustrated in FIG. 14A, additional internal addresses ADDR_i18 and ADDR_i28 corresponding to free slots that are used to replace a bad block may be allocated to the first and second planes PL1 and PL2, respectively. In some example embodiments, the additional internal addresses ADDR_i18 and ADDR_i28 may be used to replace a bad block within the nonvolatile memory device 120 and may not be managed by the flash translation layer 114 of the storage controller 110. That is, an input address (i.e., an internal address) output from the flash translation layer 114 of the storage controller 110 may not directly correspond to the additional internal addresses ADDR_i18 and ADDR_i28.

For convenience of description, it is assumed that the 10th memory block BLK10 of the first plane PL1 is the bad block BB. In this case, as illustrated in FIG. 14B, the address table 126b-1 may be configured such that the 10th internal address ADDR_i10 corresponding to the 10th memory block BLK10 of the first plane PL1 is replaced into the 18th additional internal address ADDR_i18, and the I2P converter 126c-1 may be configured such that the 18th additional internal address ADDR_i18 is converted into the 27th physical address ADD_p27 of the 27th memory block BLK27 of the second plane PL2.

In this case, when the 10th internal address ADDR_i10 is received as the input address ADDR_input, the address replacing circuit 126-1 may replace the input address ADDR_input of the 10th internal address ADDR_i10 into the replaced address ADDR_rp of the 18th additional internal address ADDR_i18, and may output the 27th physical address ADD_p27 corresponding to the 18th additional internal address ADDR_i18. As such, the nonvolatile memory device 120 may perform the access to the 27th memory block BLK27 of the second plane PL2 instead of the 10th memory block BLK10 of the first plane PL1.

Alternatively, as illustrated in FIG. 14C, the I2P converter 126c-1 may be configured such that the 10th physical address ADD_p10 corresponding to the 10th memory block BLK10 of the first plane PL1 corresponds to the 18th additional internal address ADDR_i18 of the first plane PL1 and the 10th internal address ADDR_i10 corresponding to the 10th memory block BLK10 of the first plane PL1 corresponds to the 27th physical address ADD_p27 corresponding to the 27th memory block BLK27 of the second plane PL2.

In this case, when the 10th internal address ADDR_i10 is received as the input address ADDR_input, the address replacing circuit 126-1 may output the 27th physical address ADD_p27 corresponding to the 10th internal address ADDR_i10 (i.e., without the replacement into an internal address). As such, the nonvolatile memory device 120 may perform the access to the 27th memory block BLK27 of the second plane PL2 instead of the 10th memory block BLK10 of the first plane PL1.

In some example embodiments, the 27th memory block BLK27 of the second plane PL2 may be a normal block (i.e., a memory block managed or used by the flash translation layer 114 of the storage controller 110).

However, because the 27th memory block BLK27 of the second plane PL2 is replaced into the 10th memory block BLK10 of the first plane PL1, the 27th memory block BLK27 may store data to be stored in the 10th memory block BLK10. That is, the 27th memory block BLK27 of the second plane PL2 may be incapable of being normally used by the flash translation layer 114 of the storage controller 110. Accordingly, to hinder or prevent the 27th memory block BLK27 of the second plane PL2 from being directly accessed by the flash translation layer 114, the 27th memory block BLK27 of the second plane PL2 may be processed to be set to an invalid block. In this case, the flash translation layer 114 may not directly access the 27th memory block BLK27 of the second plane PL2.

As described above, an address replacing circuit according to example embodiments of the present disclosure may replace a bad block into a spare block or normal block of another plane through various manners. The above example embodiments are some example of the present disclosure, and the scope and spirit of the present disclosure is not limited thereto.

Figure 15:
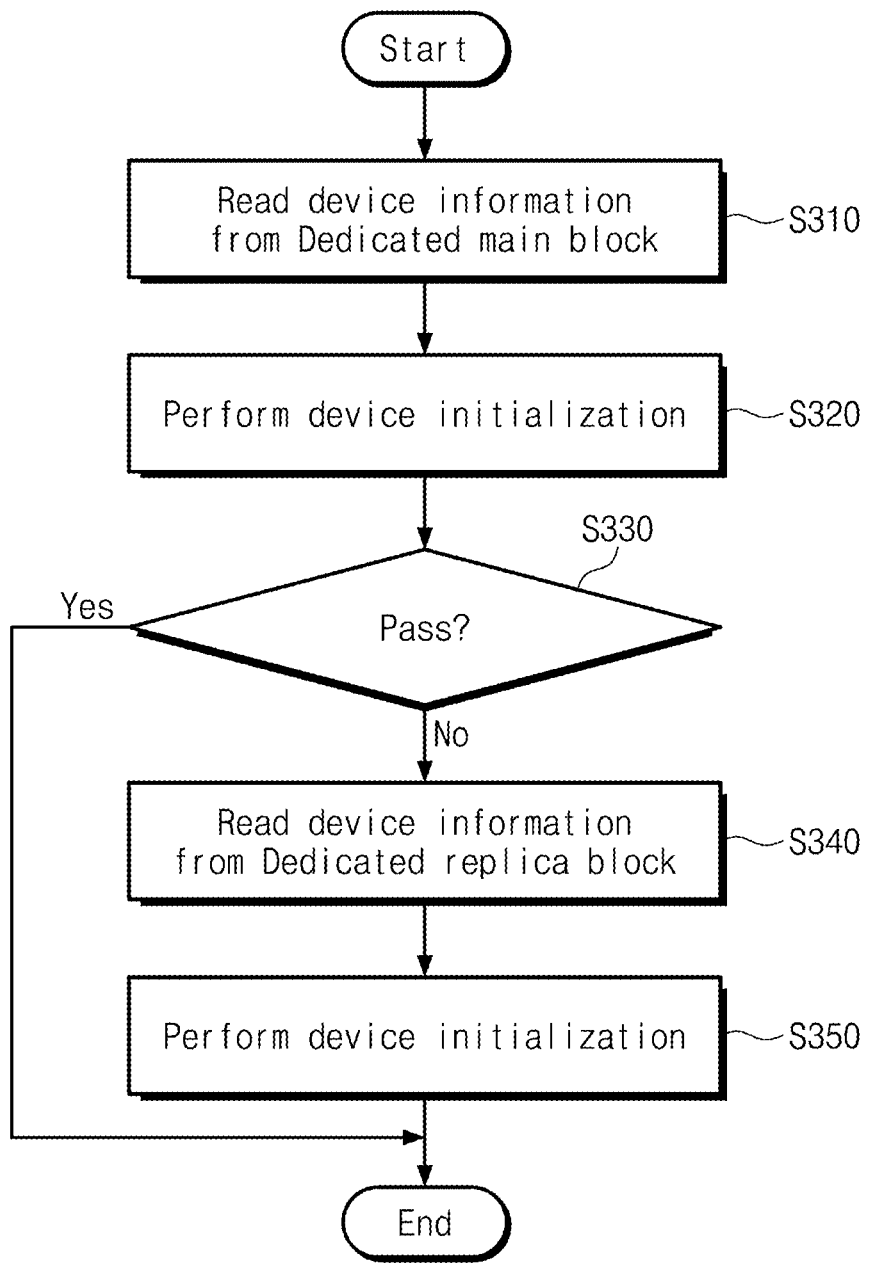
FIG. 15 is a flowchart for describing an operation of a nonvolatile memory device of FIG. 2.
Figure 16:
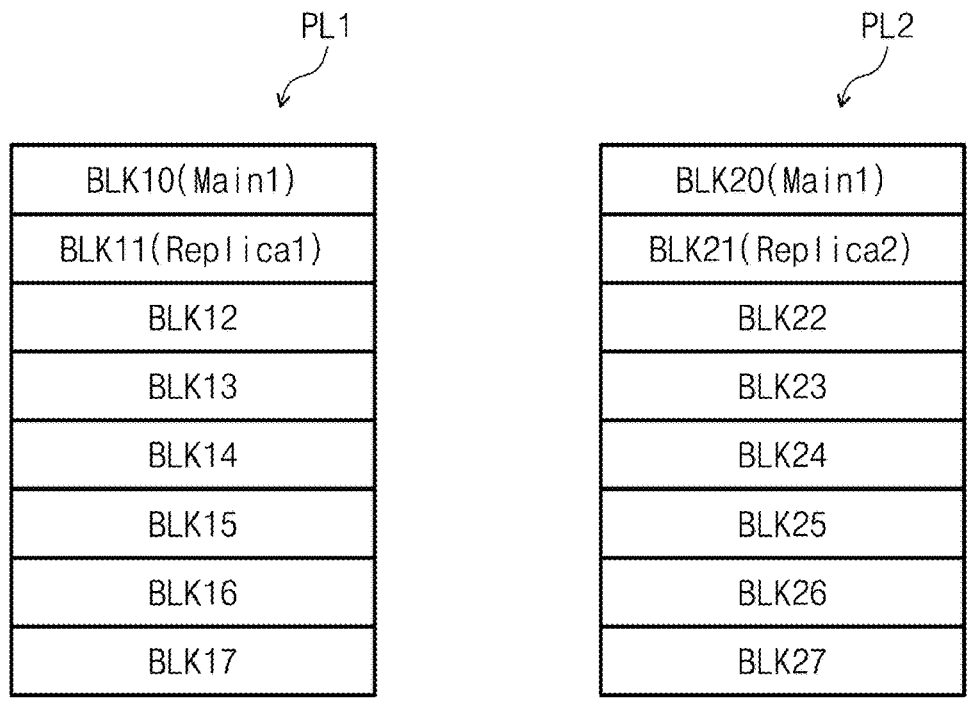
FIGS. 16 and 17 are diagrams for describing an operation according to the flowchart of FIG. 15.
Figure 17:
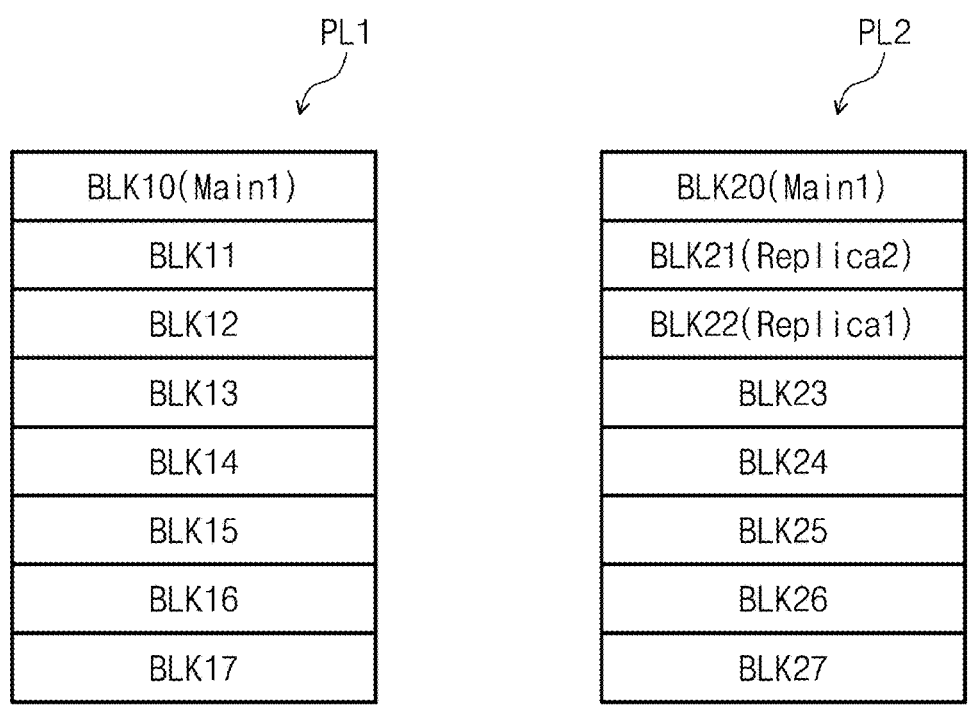

FIG. 15 is a flowchart for describing an operation of a nonvolatile memory device of FIG. 2. FIGS. 16 and 17 are diagrams for describing an operation according to the flowchart of FIG. 15. Referring to FIGS. 2, 15, 16, and 17, in operation S310, the nonvolatile memory device 120 may read device information from a dedicated main block. In operation S320, the nonvolatile memory device 120 may perform device initialization based on the device information. In some example embodiments, the device initialization may be performed by the control logic circuit 123 described with reference to FIG. 2.

For example, as illustrated in FIG. 16, the nonvolatile memory device 120 may include dedicated main blocks Main1 and Main2 configured to store the device information. The device information may include various information or firmware code for the initialization operation of the nonvolatile memory device 120. In some example embodiments, the dedicated main blocks Main1 and Main2 may be equally allocated or distributed to the plurality of planes PL1 and PL2 of the nonvolatile memory device 120. For example, the first dedicated main block Main1 may be placed in the first plane PL1, and the second dedicated main block Main2 may be placed in the second plane PL2. Alternatively, each of (or at least one of) the plurality of planes PL1 and PL2 may include at least one main block.

In operation S330, whether the initialization operation of the nonvolatile memory device 120 is successful (i.e., is passed) may be determined. When it is determined that the initialization operations are passed, the nonvolatile memory device 120 may terminate the initialization process. When it is determined that the initialization operations are not passed (e.g., when the device information is not normally read from at least one of dedicated main blocks), in operation S340, the nonvolatile memory device 120 may read the device information from a dedicated replica block. In operation S350, the nonvolatile memory device 120 may perform the initialization operation based on the device information read from the dedicated replica block.

For example, as illustrated in FIG. 16, the first and second planes PL1 and PL2 may include the first and second dedicated main blocks Main1 and Main2, respectively. The first and second planes PL1 and PL2 may include first and second dedicated replica blocks Replica1 and Replica2, respectively. The first and second dedicated replica blocks Replica1 and Replica2 may be blocks corresponding to a result of replicating the dedicated main blocks Main1 and Main2 of the same planes. For example, the first dedicated replica block Replica1 included in the first plane PL1 may be configured to store the same device information as the first dedicated main block Main1 of the same plane, for example, the first plane PL1. The second dedicated replica block Replica2 included in the second plane PL2 may be configured to store the same device information as the second dedicated main block Main2 of the same plane, for example, the second plane PL2.

In some example embodiments, as described above, a bad block occurrence ratio or the number of available spare blocks of the first plane PL1 may be different from a bad block occurrence ratio or the number of available spare blocks of the second plane PL2. In this case, the number of available normal blocks of the first plane PL1 may be different from the number of available normal blocks of the second plane PL2, which causes a decrease in the whole available capacity of the nonvolatile memory device 120. In this case, more dedicated replica blocks may be included in a certain plane depending on a bad block occurrence ratio, the number of available spare blocks, or the number of available normal blocks of each of (or at least one of) the first and second planes PL1 and PL2.

For example, it is assumed that a bad block ratio of the first plane PL1 is higher than a bad block ratio of the second plane PL2. In this case, as illustrated in FIG. 17, the first and second dedicated replica blocks Replica1 and Replica2 may be included in the second plane PL2 whose bad block ratio is relatively lower. Because the first plane PL1 does not include a dedicated replica block as illustrated in FIG. 17, a ratio of available normal blocks may increase.

Some example embodiments (i.e., an example embodiment of FIG. 17) in which a dedicated main block or dedicated replica block is replaced into a spare block or normal block of another plane may be performed based on a method similar to or the same as the memory block replacement method described with reference to FIGS. 1 to 14, except that the input address ADDR_input is generated or determined within the nonvolatile memory device 120 instead of being provided from the storage controller 110.

Figure 18B:
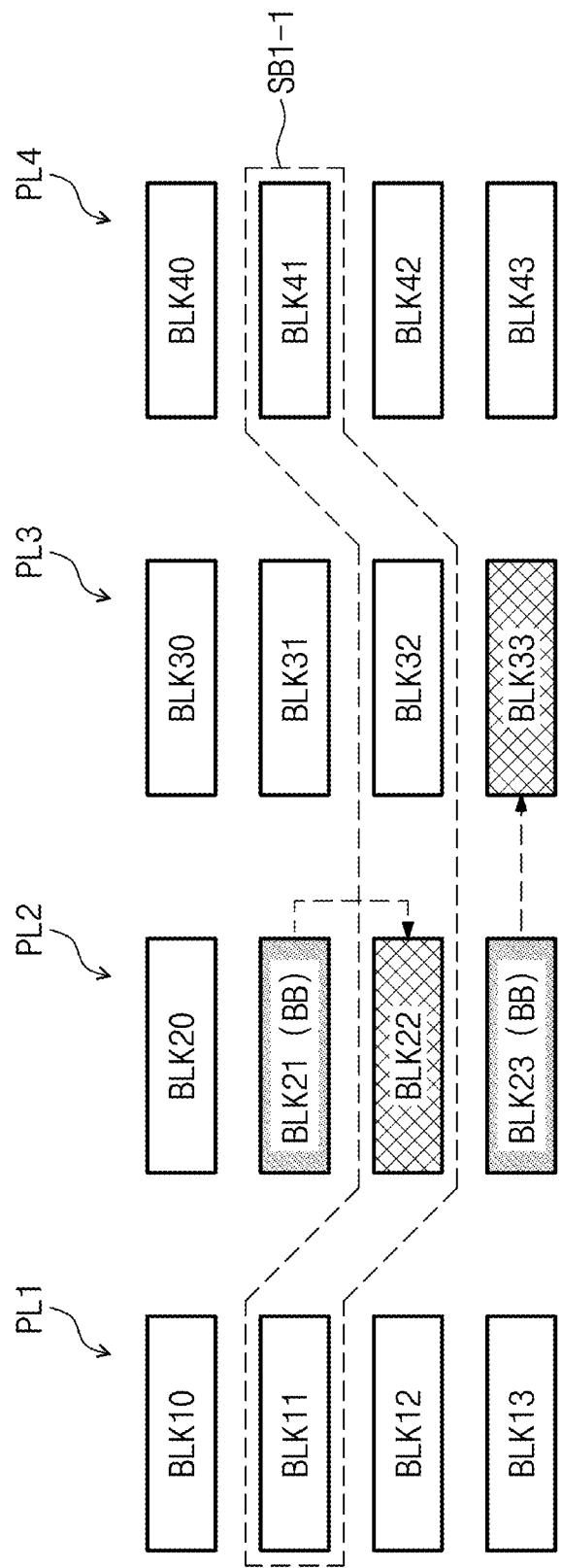

FIGS. 18A and 18B are diagrams for describing an operation of a nonvolatile memory device of FIG. 2. Referring to FIGS. 1, 2, 18A, and 18B, the memory cell array 121 of the nonvolatile memory device 120 may include first to fourth planes PL1, PL2, PL3, and PL4. The first to fourth planes PL1, PL2, PL3, and PL4 may include memory blocks BLK10 to BLK13, BLK20 to BLK23, BLK30 to BLK33, and BLK40 to BLK43.

In some example embodiments, at least some of the memory blocks BLK10 to BLK13, BLK20 to BLK23, BLK30 to BLK33, and BLK40 to BLK43 of the first to fourth planes PL1, PL2, PL3, and PL4 may form a super block. For example, the 11th memory block BLK11 of the first plane PL1, the 21st memory block BLK21 of the second plane PL2, the 32nd memory block BLK32 of the third plane PL3, and the 41st memory block BLK41 of the fourth plane PL4 may form a first super block SB1.

In some example embodiments, a super block may indicate an operating unit by which the access is made at the same time through the multi-plane operation of the nonvolatile memory device 120. That is, the memory blocks BLK11, BLK21, BLK32, and BLK41 included in the first super block SB1 may be simultaneously accessed through the multi-plane operation.

In some example embodiments, it is assumed that some memory blocks BLK21 and BLK23 of the second plane PL2 are the bad blocks BB. In this case, a bad block may be replaced into a memory block of the same plane or another plane based on whether the bad block constitutes a super block. For example, in the case where the 21st memory block BLK21 is the bad block BB, because the 21st memory block BLK21 is a memory block constituting the first super block SB1, the 21st memory block BLK21 may be replaced into the 22nd memory block BLK22 of the same plane, for example, the second plane PL2. In this case, the first super block SB1 may be replaced into a (1-1)-th super block SB1-1, and the (1-1)-th super block SB1-1 may include the memory blocks BLK11, BLK22, BLK32, and BLK41 respectively included in the first to fourth planes PL1, PL2, PL3, and PL4. As such, the memory blocks BLK11, BLK22, BLK32, and BLK41 of the (1-1)-th super block SB1-1 may be simultaneously accessed through the multi-plane operation.

In contrast, in the case where the 23rd memory block BLK23 is the bad block BB, because the 23rd memory block BLK23 is not a memory block constituting the first super block SB1, the 23rd memory block BLK23 may be replaced into the 33rd memory block BLK33 of another plane, for example, the third plane PL3. In this case, even though the 23rd memory block BLK23 is replaced into a memory block of another plane, because the access through the single-plane operation is possible, the access operation may be normally performed. Also, because the 23rd memory block BLK23 is not a memory block constituting the first super block SB1, the reduction of performance of the nonvolatile memory device 120 may not be caused.

Figure 19A:
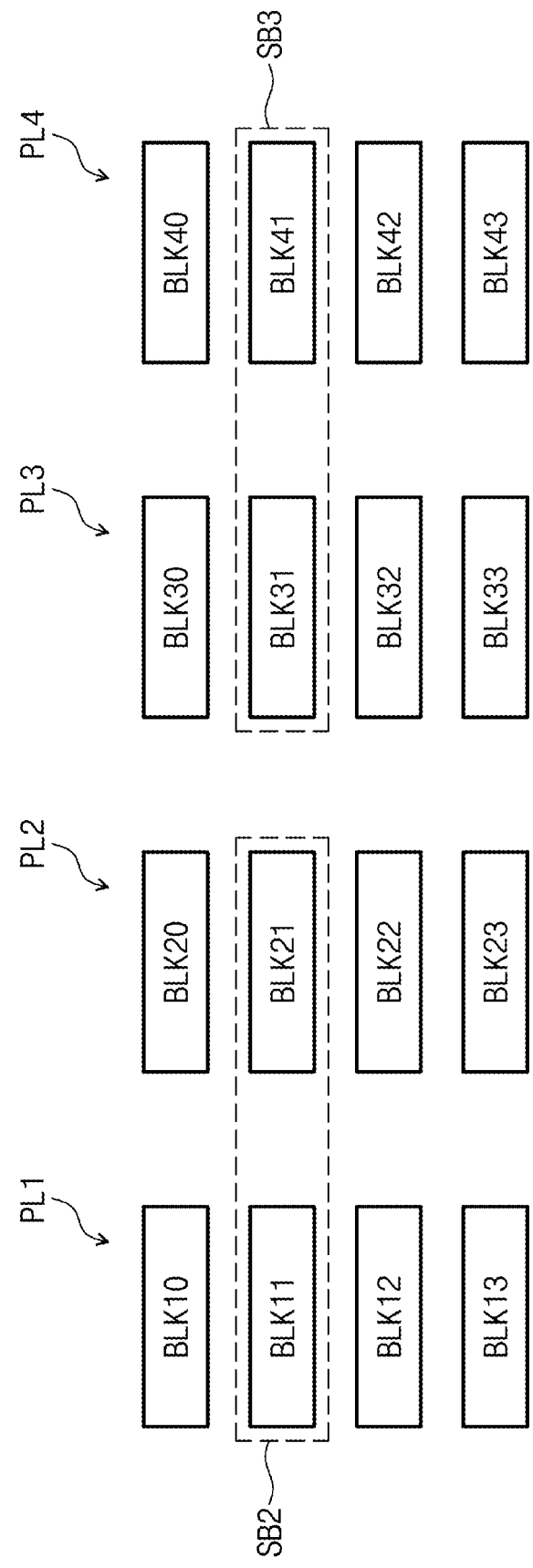
FIGS. 19A and 19B are diagrams for describing an operation of a nonvolatile memory device of FIG. 2.
Figure 19B:
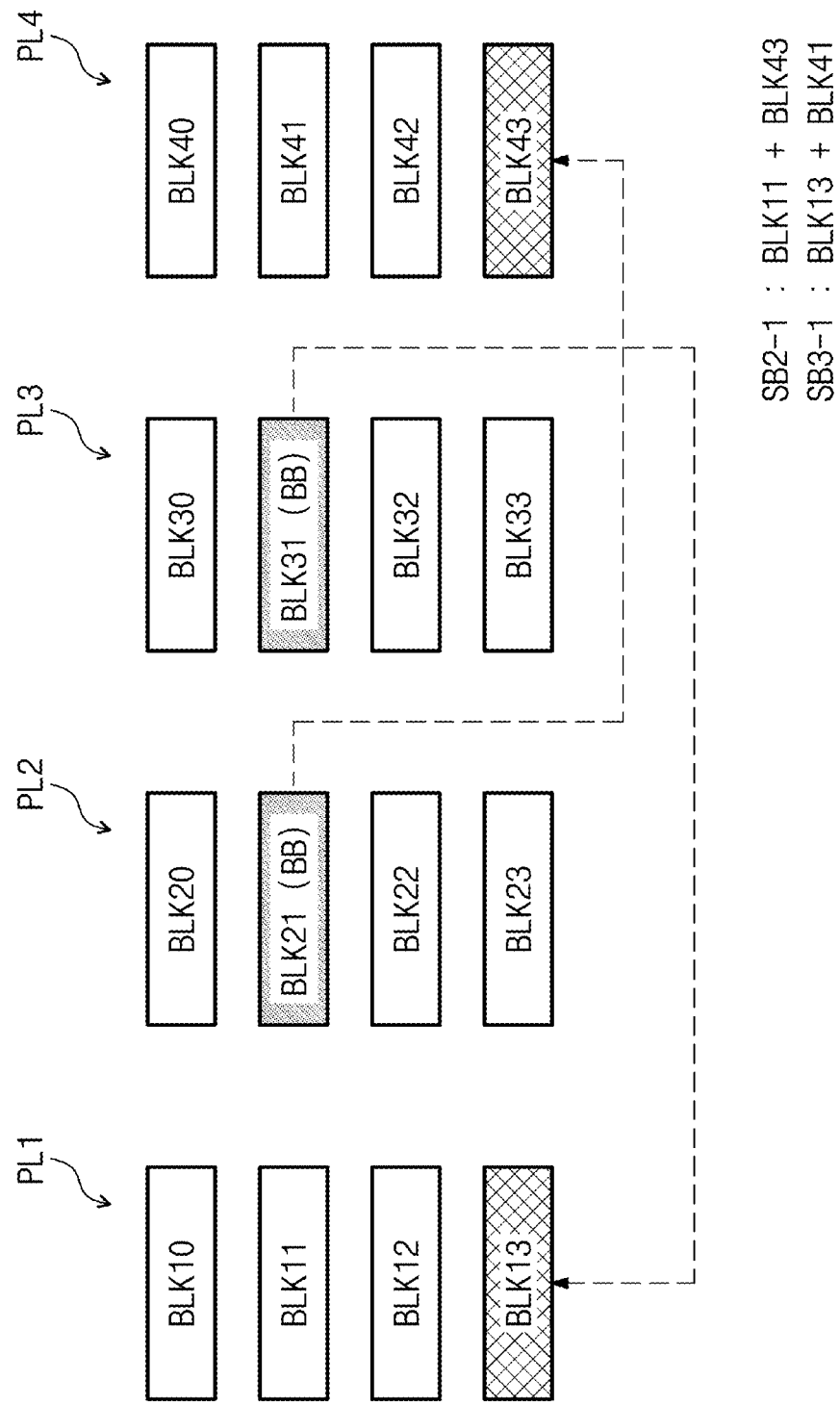

FIGS. 19A and 19B are diagrams for describing an operation of a nonvolatile memory device of FIG. 2. Referring to FIGS. 1, 2, 19A, and 19B, the memory cell array 121 of the nonvolatile memory device 120 may include the first to fourth planes PL1, PL2, PL3, and PL4. The first to fourth planes PL1, PL2, PL3, and PL4 may include memory blocks BLK10 to BLK13, BLK20 to BLK23, BLK30 to BLK33, and BLK40 to BLK43.

Unlike the example embodiment of FIGS. 18A and 18B, in the example embodiment of FIGS. 19A and 19B, a super block may be composed of two memory blocks. For example, the 11th memory block BLK11 of the first plane PL1 and the 21st memory block BLK21 of the second plane PL2 may form a second super block SB2, and the 31st memory block BLK31 of the third plane PL3 and the 41st memory block BLK41 of the fourth plane PL4 may form a third super block SB3.

For example, it is assumed that the 21st memory block BLK21 of the second plane PL2 and the 31st memory block BLK31 of the third plane PL3 are the bad blocks BB. In this case, as illustrated in FIG. 19B, the 21st memory block BLK21 of the second plane PL2 may be replaced into the 43rd memory block BLK43 of the fourth plane PL4, and the 31st memory block BLK31 of the third plane PL3 may be replaced into the 13th memory block BLK13 of the first plane PL1.

As such, the second super block SB2 may be reorganized as a (2-1)-th super block SB2-1, and the third super block SB3 may be reorganized as a (3-1)-th super block SB3-1. For example, the (2-1)-th super block SB2-1 may include the 11th memory block BLK11 of the first plane PL1 and the 43rd memory block BLK43 of the fourth plane PL4, and the (3-1)-th super block SB3-1 may include the 41st memory block BLK41 of the fourth plane PL4 and the 13th memory block BLK13 of the first plane PL1. That is, in the case where a memory block constituting a super block is a bad block, the bad block may be replaced into a memory block of a plane, which does not constitute the super block, and thus, the multi-plane operation may be normally performed on the super block.

In some example embodiments, a memory block replacing operation based on the above configuration of the super block may be determined in the process of manufacturing the nonvolatile memory device 120 or may be controlled or set by the storage controller 110 while driving the nonvolatile memory device 120.

Figure 20:
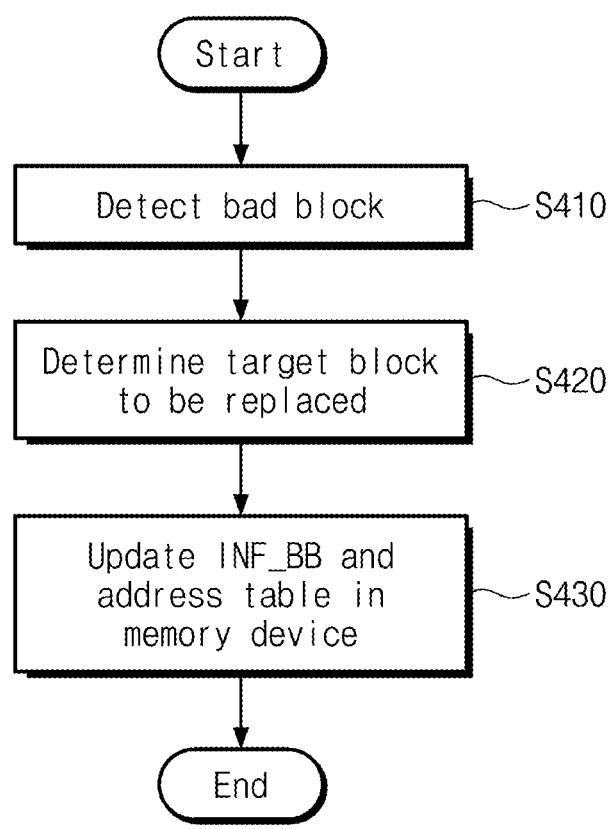
FIG. 20 is a flowchart illustrating an operation of a storage controller of FIG. 1.

FIG. 20 is a flowchart illustrating an operation of a storage controller of FIG. 1. Referring to FIGS. 1 and 20, in operation S410, the storage controller 110 may detect a bad block of the nonvolatile memory device 120. For example, the storage controller 110 may detect various bad blocks (e.g., a bad block by a program fail, a bad block by an uncorrectable error, or a bad block by the excess of P/E cycles) occurring while driving the nonvolatile memory device 120.

In operation S420, the storage controller 110 may determine a target block to be replaced with the bad block. For example, the storage controller 110 may determine a target block into which a bad block is replaced. In some example embodiments, the nonvolatile memory device 120 may select a target block from memory blocks included in a plane different from a plane, in which a bad block occurs, from among a plurality of planes included in the nonvolatile memory device 120. Various conditions for determining a target block or a plane in which a target block is included are described above, and thus, additional description will be omitted to avoid redundancy.

In operation S430, the storage controller 110 may update an address table and bad block information of the nonvolatile memory device 120. For example, the address table and the bad block information may be updated based on information about the target block determined through operation S420 and the bad block. In this case, when the storage controller 110 provides an input address corresponding to the bad block, the nonvolatile memory device 120 may perform an access to the target block based on the updated address table and the updated bad block information.

As described above, the address replacing circuit 126 of the nonvolatile memory device 120 according to some example embodiments of the present disclosure may be implemented to replace a memory block associated with the initial defect occurring in the process of manufacturing the nonvolatile memory device 120, but the present disclosure is not limited thereto. For example, the address replacing circuit 126 may be configured or reorganized by the storage controller 110 such that a target block is replaced into a bad block occurring during the operation of the nonvolatile memory device 120.

Figure 21:
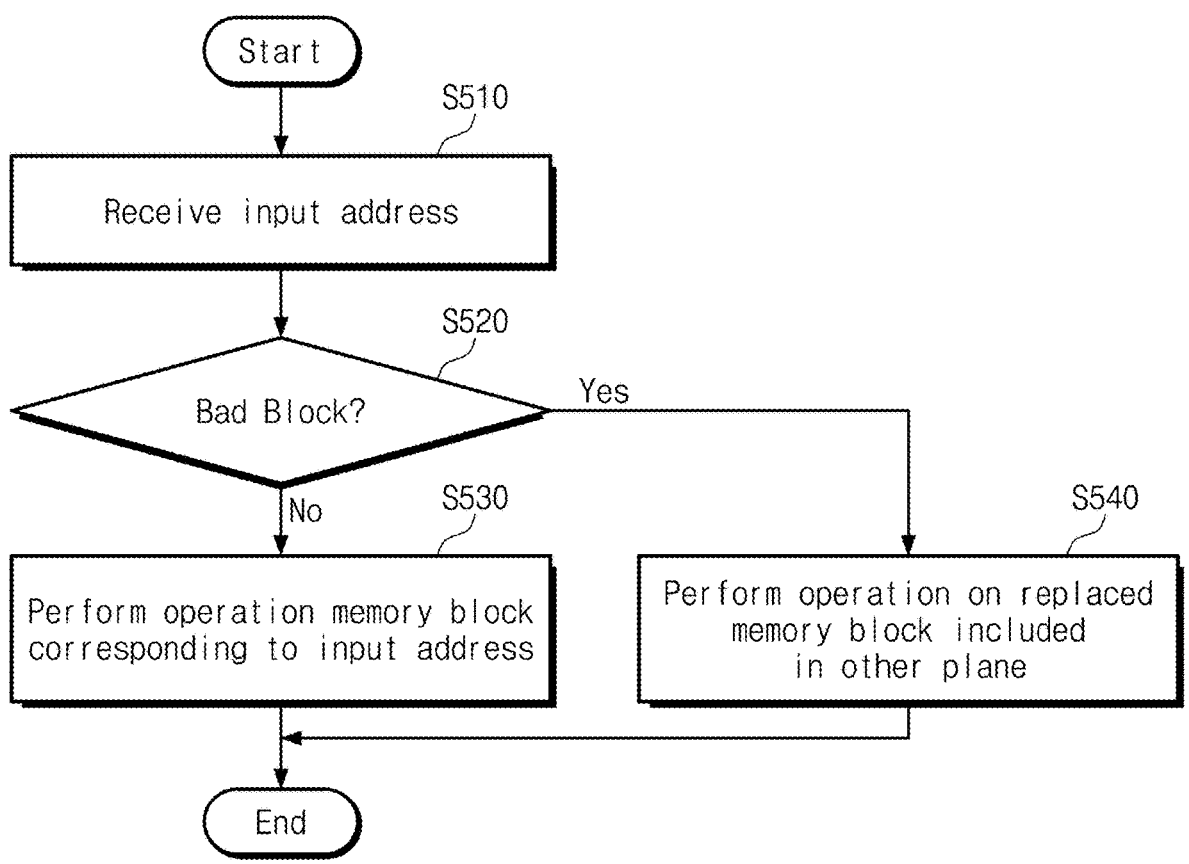
FIG. 21 is a flowchart illustrating an operation of a nonvolatile memory device of FIG. 1.

FIG. 21 is a flowchart illustrating an operation of a nonvolatile memory device of FIG. 1. Referring to FIGS. 1, 2, and 21, in operation S510, the nonvolatile memory device 120 may receive the input address ADDR_input from the storage controller 110. In some example embodiments, the input address ADDR_input may be a physical address converted by the flash translation layer 114 of the storage controller 110.

In operation S520, the nonvolatile memory device 120 may determine whether a memory block corresponding to an input address is a bad block. For example, the address replacing circuit 126 of the nonvolatile memory device 120 may determine whether a memory block corresponding to the input address ADDR_input is a bad block, based on the bad block information INF_BB.

When it is determined that the memory block corresponding to the input address ADDR_input is not a bad block, in operation S530, the nonvolatile memory device 120 may perform an operation on the memory block corresponding to the input address ADDR_input. When it is determined that the memory block corresponding to the input address ADDR_input is a bad block, in operation S540, the nonvolatile memory device 120 may perform an operation on a replaced memory block. In some example embodiments, the replaced memory block may be included in a plane different from a plane in which a memory block corresponding to an input address is included.

As described above, according to some example embodiments of the present disclosure, a bad block that occurs in the nonvolatile memory device 120 may be replaced into a memory block of the same plane or another plane, based on various conditions (e.g., a bad block ratio, an available spare block ratio, and an available normal block ratio of each plane, and whether a bad block is a dedicated block). Accordingly, the whole available capacity of the nonvolatile memory device 120 may increase.

Figure 22:
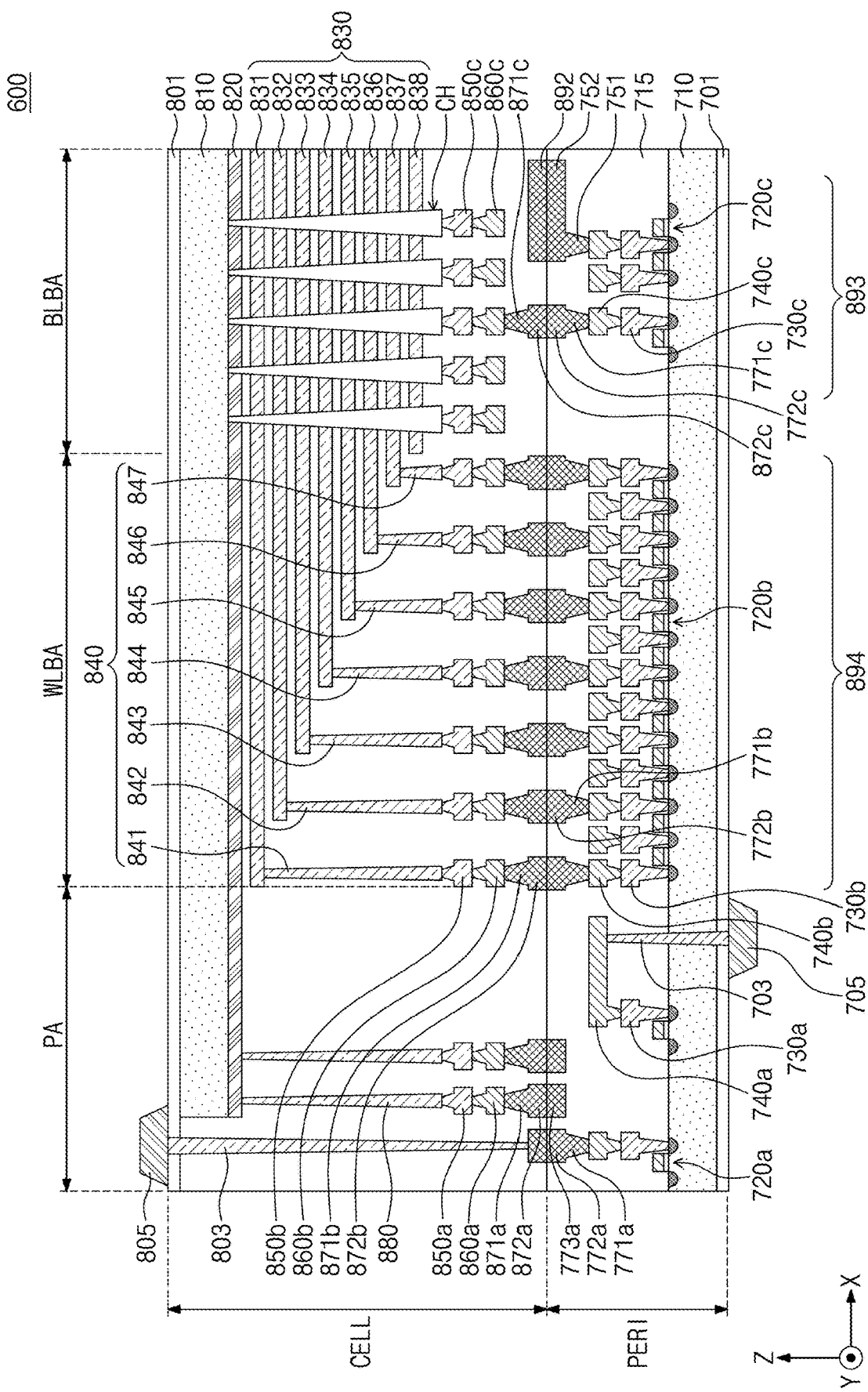
FIG. 22 is a cross-sectional view illustrating a memory device according to some example embodiments of the present disclosure.

FIG. 22 is a diagram illustrating a memory device 600 according to another example embodiment.

Referring to FIG. 22, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, may not be limited thereto. For example, the bonding metals may also be formed of aluminum (Al) or tungsten (W).

Each of (or at least one of) the peripheral circuit region PERI and the cell region CELL of the memory device 600 may include an external pad bonding area PA, a word line bonding area WLBA, and a bit line bonding area BLBA.

The peripheral circuit region PERI may include a first substrate 710, an interlayer insulating layer 715, a plurality of circuit elements 720a, 720b, and 720c formed on the first substrate 710, first metal layers 730a, 730b, and 730c respectively connected to the plurality of circuit elements 720a, 720b, and 720c, and second metal layers 740a, 740b, and 740c formed on the first metal layers 730a, 730b, and 730c. In some example embodiments, the first metal layers 730a, 730b, and 730c may be formed of tungsten having relatively high electrical resistivity, and the second metal layers 740a, 740b, and 740c may be formed of copper having relatively low electrical resistivity.

In some example embodiments illustrate in FIG. 22, although only the first metal layers 730a, 730b, and 730c and the second metal layers 740a, 740b, and 740c are shown and described, the example embodiments are not limited thereto, and one or more additional metal layers may be further formed on the second metal layers 740a, 740b, and 740c. At least a portion of the one or more additional metal layers formed on the second metal layers 740a, 740b, and 740c may be formed of aluminum or the like having a lower electrical resistivity than those of copper forming the second metal layers 740a, 740b, and 740c.

The interlayer insulating layer 715 may be disposed on the first substrate 710 and cover the plurality of circuit elements 720a, 720b, and 720c, the first metal layers 730a, 730b, and 730c, and the second metal layers 740a, 740b, and 740c. The interlayer insulating layer 715 may include an insulating material such as silicon oxide, silicon nitride, or the like.

Lower bonding metals 771b and 772b may be formed on the second metal layer 740b in the word line bonding area WLBA. In the word line bonding area WLBA, the lower bonding metals 771b and 772b in the peripheral circuit region PERI may be electrically bonded to upper bonding metals 871b and 872b of the cell region CELL. The lower bonding metals 771b and 772b and the upper bonding metals 871b and 872b may be formed of aluminum, copper, tungsten, or the like. Further, the upper bonding metals 871b and 872b in the cell region CELL may be referred as first metal pads and the lower bonding metals 771b and 772b in the peripheral circuit region PERI may be referred as second metal pads.

The cell region CELL may include at least one memory block. The cell region CELL may include a second substrate 810 and a common source line 820. On the second substrate 810, a plurality of word lines 831 to 838 (i.e., 830) may be stacked in a direction (a Z-axis direction), perpendicular (or substantially perpendicular) to an upper surface of the second substrate 810. At least one string select line and at least one ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (a Z-axis direction), perpendicular (or substantially perpendicular) to the upper surface of the second substrate 810, and pass through the plurality of word lines 830, the at least one string select line, and the at least one ground select line. The channel structure CH may include a data storage layer, a channel layer, a buried insulating layer, and the like, and the channel layer may be electrically connected to a first metal layer 850c and a second metal layer 860c. For example, the first metal layer 850c may be a bit line contact, and the second metal layer 860c may be a bit line. In some example embodiments, the bit line 860c may extend in a first direction (a Y-axis direction), parallel (or substantially parallel) to the upper surface of the second substrate 810.

In some example embodiments illustrated in FIG. 22, an area in which the channel structure CH, the bit line 860c, and the like are disposed may be defined as the bit line bonding area BLBA. In the bit line bonding area BLBA, the bit line 860c may be electrically connected to the circuit elements 720c providing a page buffer 893 in the peripheral circuit region PERI. The bit line 860c may be connected to upper bonding metals 871c and 872c in the cell region CELL, and the upper bonding metals 871c and 872c may be connected to lower bonding metals 771c and 772c connected to the circuit elements 720c of the page buffer 893. In some example embodiments, a program operation may be executed based on a page unit as write data of the page-unit is stored in the page buffer 893, and a read operation may be executed based on a sub-page unit as read data of the sub-page unit is stored in the page buffer 893. Also, in the program operation and the read operation, units of data transmitted through bit lines may be different from each other.

In the word line bonding area WLBA, the plurality of word lines 830 may extend in a second direction (an X-axis direction), parallel (or substantially parallel) to the upper surface of the second substrate 810 and perpendicular (or substantially perpendicular) to the first direction, and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850b and a second metal layer 860b may be connected to an upper portion of the plurality of cell contact plugs 840 connected to the plurality of word lines 830, sequentially. The plurality of cell contact plugs 840 may be connected to the peripheral circuit region PERI by the upper bonding metals 871b and 872b of the cell region CELL and the lower bonding metals 771b and 772b of the peripheral circuit region PERI in the word line bonding area WLBA.

The plurality of cell contact plugs 840 may be electrically connected to the circuit elements 720b forming a row decoder 894 in the peripheral circuit region PERI. In some example embodiments, operating voltages of the circuit elements 720b of the row decoder 894 may be different than operating voltages of the circuit elements 720c forming the page buffer 893. For example, operating voltages of the circuit elements 720c forming the page buffer 893 may be greater than operating voltages of the circuit elements 720b forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850a and a second metal layer 860a may be stacked on an upper portion of the common source line contact plug 880, sequentially. For example, an area in which the common source line contact plug 880, the first metal layer 850a, and the second metal layer 860a are disposed may be defined as the external pad bonding area PA.

Input-output pads 705 and 805 may be disposed in the external pad bonding area PA. Referring to FIG. 22, a lower insulating film 701 covering a lower surface of the first substrate 710 may be formed below the first substrate 710, and a first input-output pad 705 may be formed on the lower insulating film 701. The first input-output pad 705 may be connected to at least one of the plurality of circuit elements 720a, 720b, and 720c disposed in the peripheral circuit region PERI through a first input-output contact plug 703, and may be separated from the first substrate 710 by the lower insulating film 701. In addition, a side insulating film may be disposed between the first input-output contact plug 703 and the first substrate 710 to electrically separate the first input-output contact plug 703 and the first substrate 710.

Referring to FIG. 22, an upper insulating film 801 covering the upper surface of the second substrate 810 may be formed on the second substrate 810, and a second input-output pad 805 may be disposed on the upper insulating layer 801. The second input-output pad 805 may be connected to at least one of the plurality of circuit elements 720a, 720b, and 720c disposed in the peripheral circuit region PERI through a second input-output contact plug 803. In the example embodiment, the second input-output pad 805 is electrically connected to a circuit element 720a.

According to some example embodiments, the second substrate 810 and the common source line 820 may not be disposed in an area in which the second input-output contact plug 803 is disposed. Also, the second input-output pad 805 may not overlap the word lines 830 in the third direction (the Z-axis direction). Referring to FIG. 22, the second input-output contact plug 303 may be separated from the second substrate 810 in a direction, parallel (or substantially parallel) to the upper surface of the second substrate 810, and may pass through the interlayer insulating layer 815 of the cell region CELL to be connected to the second input-output pad 805.

According to some example embodiments, the first input-output pad 705 and the second input-output pad 805 may be selectively formed. For example, the memory device 600 may include only the first input-output pad 705 disposed on the first substrate 710 or the second input-output pad 805 disposed on the second substrate 810. Alternatively, the memory device 600 may include both the first input-output pad 705 and the second input-output pad 805.

A metal pattern provided on an uppermost metal layer may be provided as a dummy pattern or the uppermost metal layer may be absent, in each of (or at least one of) the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872a of the cell region CELL so as to be connected to each other, in an uppermost metal layer of the peripheral circuit region PERI. In the peripheral circuit region PERI, the lower metal pattern 773a formed in the uppermost metal layer of the peripheral circuit region PERI may not be connected to a contact. Similarly, in the external pad bonding area PA, an upper metal pattern 872a, corresponding to the lower metal pattern 773a formed in an uppermost metal layer of the peripheral circuit region PERI, and having the same shape as a lower metal pattern 773a of the peripheral circuit region PERI, may be formed in an uppermost metal layer of the cell region CELL.

The lower bonding metals 771b and 772b may be formed on the second metal layer 740b in the word line bonding area WLBA. In the word line bonding area WLBA, the lower bonding metals 771b and 772b of the peripheral circuit region PERI may be electrically connected to the upper bonding metals 871b and 872b of the cell region CELL by a Cu-to-Cu bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In some example embodiments, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

In some example embodiments, the peripheral circuit region PERI may include an address replacing circuit described with reference to FIGS. 1 to 20, and the cell region CELL may include planes or memory blocks described with reference to FIGS. 1 to 20. The address replacing circuit of the peripheral circuit region PERI may replace an address received from an external controller and may control the planes or memory blocks of the cell region CELL.

According to the present disclosure, a nonvolatile memory device may include a plurality of planes, and each of (or at least one of) the plurality of planes may include a plurality of memory blocks. When a bad block is detected from the plurality of memory blocks, the bad block may be replaced into one of memory blocks of a plane different from a plane in which the bad block is included. As such, even in the case where bad block ratios of the planes are different, an available capacity of the nonvolatile memory device may be improved. Accordingly, a nonvolatile memory device with improved performance and an improved available capacity and an operation method of the nonvolatile memory device are provided.

Any of the elements and/or functional blocks disclosed above may include or be implemented in processing circuitry such as hardware including logic circuits; a hardware/software combination such as a processor executing software; or a combination thereof. For example, the processing circuitry including the host controller 11a, packet manager 115, ADDR replacing circuit 126, address decoder 122, control logic and voltage generating circuit 123, more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A nonvolatile memory device comprising:
a first plane including a plurality of memory blocks;
a second plane including a plurality of memory blocks;
an address replacing circuit in the nonvolatile memory device, the address replacement circuit configured to,
receive a first input address from an external controller, the first input address corresponding to a first memory block of the plurality of memory blocks of the first plane,
determine whether the first memory block of the first plane is a bad block based on bad block information, and
output, in response to the first memory block of the first plane being determined to be the bad block, a replaced address of a second memory block different from the first memory block selected based on the first input address and the bad block information such that the second memory block is selected from among the plurality of memory blocks of the second plane; and
an address decoder configured to control word lines connected with the second memory block of the second plane based on the replaced address.

2. The nonvolatile memory device of claim 1, wherein the address replacing circuit is further configured to:
receive a second input address from the external controller, the second input address corresponding to a third memory block of the plurality of memory blocks of the first plane; and
output a second input address based on the second input address and the bad block information,
the address decoder is further configured to control word lines connected with the third memory block of the first plane based on the second input address output from the address replacing circuit, and
the third memory block is a normal block.

3. The nonvolatile memory device of claim 1, wherein the first memory block is configured to store a firmware code used by the external controller.

4. The nonvolatile memory device of claim 1, wherein a first bad block ratio associated with the plurality of memory blocks of the first plane is higher than a second bad block ratio associated with the plurality of memory blocks of the second plane.

5. The nonvolatile memory device of claim 1, wherein
the second memory block is a spare block of the plurality of memory blocks of the second plane, and
the spare block is a memory block not configured to be managed by the external controller.

6. The nonvolatile memory device of claim 5, wherein a first ratio of available spare blocks to the plurality of memory blocks of the first plane is lower than a second ratio of available spare blocks to the plurality of memory blocks of the second plane.

7. The nonvolatile memory device of claim 1, wherein the second memory block is one of a plurality of normal blocks included in the plurality of memory blocks of the second plane, and the second memory block is processed to be set to an invalid block.

8. The nonvolatile memory device of claim 1, wherein the bad block information includes information about a bad block included in an initial defect of the nonvolatile memory device from among the plurality of memory blocks of each of the first and second planes.

9. The nonvolatile memory device of claim 1, wherein the first memory block of the first plane is not included in a super block formed through the first and second planes.

10. The nonvolatile memory device of claim 1, wherein
the plurality of memory blocks of the first plane are configured to share a plurality of first bit lines, and
the plurality of memory blocks of the second plane are configured to share a plurality of second bit lines.

11. The nonvolatile memory device of claim 10, further comprising:
a first page buffer connected through the plurality of first bit lines; and
a second page buffer connected through the plurality of second bit lines.

12. An operation method of a nonvolatile memory device that includes a first plane and a second plane, the method comprising:
receiving a first input address from an external controller, the first input address corresponding to a first memory block of a plurality of memory blocks of the first plane;
determining, by an address replacing circuit in the nonvolatile memory device, whether the first memory block of the first plane is a bad block based on bad block information;
outputting, by the address replacing circuit, a replaced address of a second memory block different from the first memory block in response to the first memory block being determined to be the bad block such that the second memory block is selected from among the plurality of memory blocks of the second plane; and controlling word lines connected with the second memory block based on the replaced address to perform an operation on the second memory block of the second plane.

13. The method of claim 12, wherein the performing of the operation on the second memory block of the plurality of memory blocks of the second plane includes:
  determining whether the first memory block is a bad block based on the first input address and bad block information;
  in response to the first memory block being the bad block, generating a replaced address corresponding to the second memory block; and
  performing an operation on the second memory block based on the replaced address.

14. The method of claim 12, further comprising:
  receiving a second input address from the external controller, the second input address corresponding to a second memory block being a normal block from among the plurality of memory blocks of the first plane; and
  performing an operation on the second memory block of the first plane.

15. The method of claim 12, wherein the first memory block stores a firmware code used by the external controller.

16. The method of claim 12, wherein the plurality of memory blocks of the first plane are configured to share a plurality of first bit lines, and
  wherein the plurality of memory blocks of the second plane are configured to share a plurality of second bit lines.

17. The method of claim 12, wherein a first bad block ratio associated with the plurality of memory blocks of the first plane is higher than a second bad block ratio associated with the plurality of memory blocks of the second plane.

18. The method of claim 12, wherein the bad block information is determined in the process of manufacturing the nonvolatile memory device and is updated by the external controller during an operation of the nonvolatile memory device.

19. A nonvolatile memory device comprising:
  a first plane including a plurality of first memory blocks, the plurality of first memory blocks connected through a plurality of first bit lines, the plurality of first memory blocks including a first dedicated main block configured to store first operational information;
  a second plane including a plurality of second memory blocks, the plurality of second memory blocks connected through a plurality of second bit lines, the plurality of second memory blocks including a second dedicated main block configured to store second operational information; and
  a control logic circuit in the nonvolatile memory device configured to perform an initialization operation on the nonvolatile memory device based on the first operational information and the second operational information by selecting dedicated replica blocks from among a plurality of memory blocks in a different plane from a respective one of the first and second dedicated main block.

20. The nonvolatile memory device of claim 19, wherein the control logic circuit is further configured to:
  perform the initialization operation based on the first operational information stored in the first dedicated main block and the second operational information stored in the second dedicated main block; and
  in response to the initialization operation failing, perform the initialization operation based on information stored in the dedicated replica blocks.

* * * * *